(12) United States Patent
Zhang et al.

(10) Patent No.: US 11,777,331 B2
(45) Date of Patent: Oct. 3, 2023

(54) MOTOR CONTROL UNIT, ELECTRIC DRIVE SYSTEM, POWERTRAIN, AND ELECTRIC VEHICLE

(71) Applicant: Huawei Digital Power Technologies Co., Ltd., Shenzhen (CN)

(72) Inventors: Xueliang Zhang, Xi'an (CN); Yang Cheng, Xi'an (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/580,015

(22) Filed: Jan. 20, 2022

(65) Prior Publication Data

US 2022/0216714 A1 Jul. 7, 2022

(30) Foreign Application Priority Data

Jan. 21, 2021 (CN) .......................... 202110083880.3

(51) Int. Cl.
| | |
|---|---|
| *H02J 7/00* | (2006.01) |
| *H02P 27/08* | (2006.01) |
| *B60L 50/51* | (2019.01) |
| *B60L 50/60* | (2019.01) |

(52) U.S. Cl.
CPC ............ *H02J 7/0068* (2013.01); *B60L 50/51* (2019.02); *B60L 50/60* (2019.02); *H02P 27/08* (2013.01); *B60L 2210/40* (2013.01)

(58) Field of Classification Search
None
See application file for complete search history.

(56) References Cited

U.S. PATENT DOCUMENTS

| | | |
|---|---|---|
| 2019/0106002 A1 | 4/2019 | Tz et al. |
| 2019/0135132 A1* | 5/2019 | Brüll ..................... B60L 50/51 |
| 2019/0149065 A1 | 5/2019 | Tarkiainen et al. |

(Continued)

FOREIGN PATENT DOCUMENTS

| | | |
|---|---|---|
| CN | 110949154 A | 4/2020 |
| CN | 110971173 A | 4/2020 |
| CN | 111267650 A | 6/2020 |

(Continued)

*Primary Examiner* — Daniel Kessie
*Assistant Examiner* — Terrence R Willoughby
(74) *Attorney, Agent, or Firm* — WOMBLE BOND DICKINSON (US) LLP

(57) ABSTRACT

This application provides a motor control unit, an electric drive system, a powertrain. A first terminal of a power transmission interface of the motor control unit is connected to a first input terminal of an inverter circuit by using a first direct current switch, and a second terminal of the power transmission interface is connected to a first terminal of a switch circuit. The switch circuit includes three switch branches, where first terminals of the three switch branches are connected to the first terminal of the switch circuit, second terminals of the three switch branches are respectively connected to one-phase output terminals of the inverter circuit, and each switch branch includes a controllable switch. The input terminal of the inverter circuit is connected to a power battery pack by using a second direct current switch. Using the motor control unit reduces a volume and hardware costs, and improves applicability.

20 Claims, 19 Drawing Sheets

(56) References Cited

U.S. PATENT DOCUMENTS

2020/0298722 A1* 9/2020 Smolenaers ............ H02J 7/345
2022/0077709 A1* 3/2022 Liu ................... H02J 7/007182

FOREIGN PATENT DOCUMENTS

| CN | 111347887 A | 6/2020 |
| CN | 111347890 A | 6/2020 |
| DE | 102018120236 A1 | 2/2020 |
| EP | 3081429 A1 | 10/2016 |
| WO | 2012157116 A1 | 11/2012 |

* cited by examiner

MOTOR CONTROL UNIT, ELECTRIC DRIVE SYSTEM, POWERTRAIN, AND ELECTRIC VEHICLE

CROSS-REFERENCE TO RELATED APPLICATIONS

This application claims priority to Chinese Patent Application No. 202110083880.3, filed on Jan. 21, 2021, which is hereby incorporated by reference in its entirety.

TECHNICAL FIELD

This application relates to the field of power electronics technologies, and in particular, to a motor control unit, an electric drive system, a powertrain, a control method, and an electric vehicle.

BACKGROUND

With aggravation of an energy shortage and environmental pollution in modern society, electric vehicles, as new energy vehicles, have received widespread attention. An electric vehicle is powered by a power battery pack, so that a motor is enabled to convert electric energy into mechanical energy to drive the electric vehicle.

Power battery packs are classified into high-voltage power battery packs and low-voltage power battery packs based on voltages provided by the power battery packs. When a high-voltage power battery pack is installed on an electric vehicle, a high-voltage charging pile is used to charge the high-voltage power battery pack. When a low-voltage power battery pack is installed on the electric vehicle, a low-voltage charging pile is used to charge the low-voltage power battery pack. However, there may be a scenario in which a low-voltage charging pile charges a high-voltage power battery pack. To ensure that the high-voltage power battery pack can still be normally charged in this case, a charging circuit of the power battery pack is required to be able to adapt to different input voltages. This increases a volume and costs of the charging circuit.

To reduce the volume and the costs of the charging circuit, an existing boost charging solution is shown in FIG. 1. A negative output of a direct current charging pile 10 is connected to a negative electrode of a power battery pack 30, and a positive output of the direct current charging pile 10 is connected to a bridge arm midpoint of an inverter circuit 40 of a motor control unit (MCU) by using an inductor L. During charging, a switching transistor T2 is first turned on, and the direct current charging pile 10 charges the inductor L. Then, a switching transistor T3 is turned on, and the switching transistor T2 is turned off. In this case, the direct current charging pile 10 and the inductor L jointly charge the power battery pack 30 to implement boost (Boost) conversion, so that the low-voltage charging pile 10 charges the high-voltage power battery pack 30.

However, this solution requires the inductor L, which increases a volume and hardware costs of the motor control unit. In addition, as vehicle-to-vehicle (V2V) and vehicle-to-grid (V2G) technologies become increasingly mature, there may also a scenario in which a high-voltage power battery pack charges a low-voltage power battery pack or a low-voltage direct current power grid accordingly. In this case, the foregoing solution is inapplicable.

SUMMARY

To resolve the foregoing problems, this application provides a motor control unit, an electric drive system, a powertrain, a control method, and an electric vehicle, to reduce a volume and hardware costs of the motor control unit when the motor control unit is reused to perform charging and discharging for a power battery pack, and to extend application scenarios and improve applicability.

According to a first aspect, this application provides a motor control unit. An input of the motor control unit is connected to a power battery pack of an electric vehicle, and an output of the motor control unit is connected to a three-phase motor. The motor control unit includes an inverter circuit, a power transmission interface, a switch circuit, a first direct current switch, and a controller. A first terminal of the power transmission interface is connected to a first input terminal of the inverter circuit by using the first direct current switch, and a second terminal of the power transmission interface is connected to a first terminal of the switch circuit. The inverter circuit is configured to convert a direct current provided by the power battery pack into an alternating current, and supply the alternating current to the three-phase motor. Each-phase output terminals of the inverter circuit are respectively connected to one-phase motor windings of the three-phase motor. The input terminal of the inverter circuit is connected to the power battery pack by using a second direct current switch. The switch circuit includes three switch branches, where first terminals of the three switch branches are connected to the first terminal of the switch circuit, second terminals of the three switch branches are respectively connected to one-phase output terminals of the inverter circuit, and each switch branch includes a controllable switch. The controller is configured to control the first direct current switch, the second direct current switch, the controllable switch, and the inverter circuit, so that a power supply charges the power battery pack when the power transmission interface is connected to the power supply, and the power battery pack discharges electricity into a load when the power transmission interface is connected to the load.

In the solution provided in this application, the inverter circuit of the motor control unit and the winding of the three-phase motor are reused. The controller controls the first direct current switch, the second direct current switch, the controllable switch, and a controllable switching transistor in the inverter circuit, to implement functions of a boost circuit and a buck circuit without requiring an inductor. This reduces a volume and hardware costs that are required by the motor control unit. In addition, the solution is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended and applicability is improved.

The foregoing first direct current switch may directly reuse an existing fast charge contactor on the electric vehicle, and may be disposed separately.

The controller in this application may be an application-specific integrated circuit (ASIC), a programmable logic device (PLD), a digital signal processor (DSP), or a combination of the ASIC, the PLD, and the DSP. The PLD may be a complex programmable logic device (CPLD), a field-programmable gate array (FPGA), a generic array logic (GAL), or any combination of the CPLD, the FPGA, and the GAL. This is not limited in this application.

The inverter circuit includes the controllable switching transistor. A type of the controllable switching transistor is not limited in this embodiment of this application, for example, may be an insulated gate bipolar transistor (IGBT), a metal-oxide semiconductor field-effect transistor (MOSFET, referred to as a MOS transistor), or a silicon carbide metal-oxide semiconductor field-effect transistor (SiC MOSFET).

The controller may send a control signal to the controllable switching transistor to control an on-off status of the controllable switching transistor. In some embodiments, the control signal is a pulse width modulation (PWM) signal.

It may be understood that, in a process in which the power battery pack is charged or discharges electricity into the load, the electric vehicle is not in a traveling state. Therefore, reusing the motor winding of the electric vehicle does not affect a traveling process of the electric vehicle. When the electric vehicle is traveling, the power battery pack stops supplying power to an external load and stops being charged. In this case, the inverter circuit and the three-phase motor are not reused.

In one embodiment, the controller is configured to obtain voltage information sent by a vehicle control unit of the electric vehicle, and control the first direct current switch, the second direct current switch, the controllable switch, and the inverter circuit based on the voltage information.

The vehicle control unit is configured to determine a value relationship between an output voltage of a direct current charging pile connected to the power transmission interface and a charging voltage required by the power battery pack, or determine a value relationship between a voltage required by the load (a direct current power grid, or a power battery pack of another electric vehicle) connected to the power transmission interface and an output voltage of the power battery pack; and obtain voltage information representing a result of the determining, and transmit the voltage information to the controller, so that the controller determines a corresponding control signal based on the voltage information.

In one embodiment, when the controller determines, based on the voltage information, that the power transmission interface is connected to the power supply and that a voltage provided by the power supply is less than a voltage of the power battery pack, the controller controls the first direct current switch and the second direct current switch to be closed, and controls the controllable switch and the inverter circuit so that the power supply charges two-phase motor windings of the three-phase motor.

The controller then controls the controllable switch and the inverter circuit to form a boost circuit. In this case, the two-phase motor windings and the power supply are connected in series to charge the power battery pack, thereby implementing boost charging for the power battery pack.

In one embodiment, when the controller determines, based on the voltage information, that the power transmission interface is connected to the power supply and that a voltage provided by the power supply is greater than a voltage of the power battery pack, the controller first controls the first direct current switch to be closed and the second direct current switch to be open, and controls the controllable switch and the inverter circuit so that the power supply charges two-phase motor windings of the three-phase motor.

The controller then controls the first direct current switch to be open and the second direct current switch to be closed, so that the power supply stops outputting a power to the power transmission interface; and controls the controllable switch and the inverter circuit to form a buck circuit, so that the two-phase motor windings charge the power battery pack.

In one embodiment, when the controller determines, based on the voltage information, that the power transmission interface is connected to the load and that a voltage required by the load is less than a voltage of the power battery pack, the controller first controls the first direct current switch and the second direct current switch to be closed, and controls the controllable switch and the inverter circuit so that the power battery pack supplies power to the load and charges two-phase motor windings of the three-phase motor. In this case, the load divides the voltage to obtain a partial voltage output by the power battery pack.

The controller then controls the controllable switch and the inverter circuit so that the two-phase motor windings supply power to the load, thereby implementing buck power feeding for the load by the power battery pack.

In one embodiment, when the controller determines, based on the voltage information, that the power transmission interface is connected to the load and that a voltage required by the load is greater than a voltage of the power battery pack, the controller first controls the first direct current switch to be open and the second direct current switch to be closed, and controls the controllable switch and the inverter circuit so that the power battery pack charges two-phase motor windings of the three-phase motor.

The controller then controls the first direct current switch to be closed and the second direct current switch to be open, and controls the controllable switch and the inverter circuit so that the two-phase motor windings supply power to the load, thereby implementing boost power feeding for the load by the power battery pack.

In one embodiment, the motor control unit further includes a third direct current switch, a first terminal of the third direct current switch is connected to the first terminal of the switch circuit, and a second terminal of the third direct current switch is connected to a second input terminal of the inverter circuit. The controller is further configured to: when determining, based on the voltage information, that the voltage provided by the power supply matches the voltage of the power battery pack, or when determining, based on the voltage information, that the voltage required by the load matches the voltage of the power battery pack, control the first direct current switch, the second direct current switch, and the third direct current switch to be closed.

In this case, the power battery pack is directly connected to the direct current charging pile, or the power battery pack is directly connected to the load.

In one embodiment, the motor control unit further includes a first capacitor. The first capacitor is connected in parallel between the first terminal and the second terminal of the power transmission interface. The first capacitor is used for filtering, and is configured to better match the two sides of the power transmission interface.

In one embodiment, the motor control unit further includes a third direct current switch and a fourth direct current switch.

A first terminal of the third direct current switch is connected to the first terminal of the switch circuit, and a second terminal of the third direct current switch is connected to a second input terminal of the inverter circuit.

The fourth direct current switch is a single-pole double-throw switch, a first non-movable terminal of the fourth direct current switch is connected to the first terminal of the switch circuit, a second non-movable terminal of the fourth direct current switch is connected to the first input terminal of the inverter circuit, and a movable terminal of the fourth direct current switch is connected to a first terminal of the power battery pack.

The controller is further configured to control working statuses of the third direct current switch and the fourth direct current switch based on the voltage information.

In one embodiment, the controller is configured to: when determining, based on the voltage information, that a voltage provided by the power supply matches a voltage of the power battery pack, or when determining, based on the voltage information, that a voltage required by the load matches a voltage of the power battery pack, control the first direct current switch, the second direct current switch, and the third direct current switch to be closed, and control the movable terminal of the fourth direct current switch to be connected to the second non-movable terminal.

In this case, the direct current power supply can directly charge the power battery pack, or the power battery pack can directly supply power to the load.

In one embodiment, when the controller determines, based on the voltage information, that the power transmission interface is connected to the power supply and that a voltage provided by the power supply is less than a voltage of the power battery pack, the controller controls the movable terminal of the fourth direct current switch to be connected to the second non-movable terminal, controls the first direct current switch and the second direct current switch to be closed, controls the third direct current switch to be open, and controls the controllable switch and the inverter circuit so that the power supply charges two-phase motor windings of the three-phase motor.

The controller then controls the controllable switch and the inverter circuit to form a boost circuit, so that the two-phase motor windings and the power supply are connected in series to charge the power battery pack, thereby implementing boost charging for the power battery pack by the power supply.

In one embodiment, when the controller determines, based on the voltage information, that the power transmission interface is connected to the power supply and that a voltage provided by the power supply is greater than a voltage of the power battery pack, the controller first controls the movable terminal of the fourth direct current switch to be connected to the second non-movable terminal, controls the first direct current switch to be closed, controls the second direct current switch to be open, controls the third direct current switch to be open, and controls the controllable switch and the inverter circuit so that the power supply charges two-phase motor windings of the three-phase motor.

The controller then controls the first direct current switch to be open and the second direct current switch to be closed, and controls the controllable switch and the inverter circuit to form a buck circuit, so that the two-phase motor windings charge the power battery pack.

In one embodiment, when the controller determines, based on the voltage information, that the power transmission interface is connected to the load and that a voltage required by the load is less than a voltage of the power battery pack, the controller first controls the movable terminal of the fourth direct current switch to be connected to the second non-movable terminal, controls the first direct current switch and the second direct current switch to be closed, controls the third direct current switch to be open, and controls the controllable switch and the inverter circuit so that the load and two-phase motor windings of the three-phase motor are connected in series to access a discharge loop of the power battery pack. In this case, the power battery pack supplies power to the load and charges the two-phase motor windings of the three-phase motor. In this case, the load divides the voltage to obtain a partial voltage output by the power battery pack.

The controller then controls the controllable switch and the inverter circuit so that the two-phase motor windings supply power to the load, thereby implementing buck power feeding for the load by the power battery pack.

In one embodiment, when the controller determines, based on the voltage information, that the power transmission interface is connected to the load and that a voltage required by the load is greater than a voltage of the power battery pack, the controller first controls the movable terminal of the fourth direct current switch to be connected to the second non-movable terminal, controls the first direct current switch to be open, controls the second direct current switch to be closed, controls the third direct current switch to be open, and controls the controllable switch and the inverter circuit so that the power battery pack charges two-phase motor windings of the three-phase motor.

The controller then controls the first direct current switch to be closed and the second direct current switch to be open, and controls the controllable switch and the inverter circuit so that the two-phase motor windings and the power battery pack are connected in series to supply power to the load, thereby implementing boost power feeding for the load by the power battery pack.

In one embodiment, the motor control unit further includes a sixth direct current switch, a first terminal of the sixth direct current switch is connected to the first terminal of the third direct current switch, and a second terminal of the sixth direct current switch is connected to the first terminal of the switch circuit. When the controller determines, based on the voltage information, that the power transmission interface is connected to the power supply and that a voltage provided by the power supply is greater than a voltage of the power battery pack, the controller controls the movable terminal of the fourth direct current switch to be connected to the first non-movable terminal, controls the first direct current switch, the second direct current switch, and the third direct current switch to be closed, controls the sixth direct current switch to be open, and controls the controllable switch and the inverter circuit. In this case, two-phase motor windings of the three-phase motor and the power battery pack are connected in series to access a discharge loop of the power supply, so that the power supply charges the two-phase motor windings of the three-phase motor and the power battery pack.

The controller then controls the controllable switch and the inverter circuit to form a buck circuit, so that the two-phase motor windings charge the power battery pack, thereby implementing buck charging for the power battery pack by the power supply.

In one embodiment, when the controller determines, based on the voltage information, that the power transmission interface is connected to the load and that a voltage required by the load is greater than an output voltage of the power battery pack, the controller first controls the movable terminal of the fourth direct current switch to be connected to the first non-movable terminal, controls the first direct current switch, the second direct current switch, and the third direct current switch to be closed, controls the sixth direct current switch to be open, and controls the controllable switch and the inverter circuit so that the power battery pack charges two-phase motor windings of the three-phase motor.

The controller then controls the controllable switch and the inverter circuit so that the two-phase motor windings and the power battery pack are connected in series to supply power to the load, thereby implementing boost power feeding for the load by the power battery pack.

In one embodiment, the motor control unit further includes a fourth direct current switch and a sixth direct current switch. A first terminal of the sixth direct current switch is connected to the second terminal of the power transmission interface, and a second terminal of the sixth direct current switch is connected to the first terminal of the switch circuit. The fourth direct current switch is a single-pole double-throw switch, a first non-movable terminal of the fourth direct current switch is connected to the first terminal of the switch circuit, a second non-movable terminal of the fourth direct current switch is connected to the first input terminal of the inverter circuit, and a movable terminal of the fourth direct current switch is connected to a first terminal of the power battery pack.

The controller is further configured to control working statuses of the fourth direct current switch and the sixth direct current switch based on the voltage information.

In one embodiment, when the controller determines, based on the voltage information, that the power transmission interface is connected to the power supply and that a voltage provided by the power supply is less than a voltage of the power battery pack, the controller controls the first direct current switch and the second direct current switch to be closed, controls the movable terminal of the fourth direct current switch to be connected to the second non-movable terminal, and controls the controllable switch and the inverter circuit so that the power supply charges two-phase motor windings of the three-phase motor.

The controller then controls the second direct current switch to be open, and controls the controllable switch and the inverter circuit so that the two-phase motor windings and the power supply are connected in series to charge the power battery pack, thereby implementing boost charging for the power battery pack by the power supply.

In one embodiment, when the controller determines, based on the voltage information, that the power transmission interface is connected to the load and that a voltage required by the load is less than a voltage of the power battery pack, the controller first controls the first direct current switch and the second direct current switch to be closed, controls the movable terminal of the fourth direct current switch to be connected to the second non-movable terminal, and controls the controllable switch and the inverter circuit so that the load and two-phase motor windings of the three-phase motor are connected in series to access a discharge loop of the power battery pack. In this case, the power battery pack supplies power to the load and charges the two-phase motor windings of the three-phase motor. In this case, the load divides the voltage to obtain a partial voltage output by the power battery pack.

The controller then controls the controllable switch and the inverter circuit so that the two-phase motor windings supply power to the load, thereby implementing buck power feeding for the load by the power battery pack.

In one embodiment, when the controller determines, based on the voltage information, that the power transmission interface is connected to the power supply, the controller first controls the first direct current switch and the sixth direct current switch to be closed, controls the movable terminal of the fourth direct current switch to be connected to the first non-movable terminal, and controls the controllable switch and the inverter circuit so that the power supply charges two-phase motor windings of the three-phase motor.

The controller then controls the first direct current switch to be open, and controls the controllable switch and the inverter circuit so that the two-phase motor windings charge the power battery pack. In this case, the motor control unit is reused to form a buck-boost circuit, to implement boost charging or buck charging for the power battery pack by the power supply.

In one embodiment, when the controller determines, based on the voltage information, that the power transmission interface is connected to the load, the controller first controls the first direct current switch, the second direct current switch, and the sixth direct current switch to be closed, controls the movable terminal of the fourth direct current switch to be connected to the first non-movable terminal, and controls the controllable switch and the inverter circuit so that the power battery pack charges two-phase motor windings of the three-phase motor. The controller then controls the controllable switch and the inverter circuit so that the two-phase motor windings supply power to the load. In this case, the motor control unit is reused to form a buck-boost circuit, to implement boost power feeding or buck power feeding for the load by the power battery pack.

In one embodiment, the motor control unit further includes a fifth direct current switch and a sixth direct current switch, a first terminal of the sixth direct current switch is connected to the second terminal of the power transmission interface, and a second terminal of the sixth direct current switch is connected to the first terminal of the switch circuit. The fifth direct current switch is a single-pole double-throw switch, a first non-movable terminal of the fifth direct current switch is connected to the first terminal of the switch circuit, a second non-movable terminal of the fifth direct current switch is connected to a second input terminal of the inverter circuit, and a movable terminal of the fifth direct current switch is connected to a second terminal of the power battery pack.

The controller is further configured to control working statuses of the third direct current switch and the fifth direct current switch based on the voltage information.

In one embodiment, the controller controls the controllable switch and the inverter circuit based on a preset time to switch a motor winding that accesses a loop. Three motor windings of the three-phase motor are reused in turn, so that a reuse time of each winding is averaged, to prevent service lives of the windings of the three-phase motor from being affected by long-time reuse of same two windings.

In one embodiment, the controller controls the controllable switch and the inverter circuit based on obtained temperature information of motor windings to switch a motor winding that accesses a loop. Three motor windings of the three-phase motor are reused in turn, so that a reuse time of each winding is averaged, to prevent service lives of the windings of the three-phase motor from being affected by long-time reuse of same two windings.

In one embodiment, the inverter circuit is a three-phase two-level inverter circuit or a three-phase three-level inverter circuit. The three-phase three-level inverter circuit may be a neutral point clamped three-level inverter circuit or an active neutral point clamped three-level inverter circuit. This is not limited in this application.

According to a second aspect, this application further provides a motor control unit. An input of the motor control unit is connected to a power battery pack of an electric vehicle, and an output of the motor control unit is connected to a three-phase motor. The motor control unit includes a power transmission interface, an inverter circuit, a controllable switch, a first direct current switch, a second direct current switch, and a controller. A first terminal of the power transmission interface is connected to a first input terminal of the inverter circuit by using the first direct current switch, and a second terminal of the power transmission interface is connected to a first terminal of the controllable switch. A second terminal of the controllable switch is connected to a one-phase output terminal of the inverter circuit. The input terminal of the inverter circuit is connected to the power battery pack by using the second direct current switch.

The controller is configured to control the first direct current switch, the second direct current switch, the controllable switch, and the inverter circuit, so that a power supply charges the power battery pack when the power transmission interface is connected to the power supply, and the power battery pack discharges electricity into a load when the power transmission interface is connected to the load.

That is, a difference between the motor control units provided in this embodiment and the foregoing embodiment lies in that the switch circuit includes only one controllable switch. Therefore, two windings of the three-phase motor are fixedly reused, thereby simplifying a control signal, reducing a quantity of used controllable switches, and further reducing costs.

In one embodiment, the controller is configured to obtain voltage information sent by a vehicle control unit of the electric vehicle, and control the first direct current switch, the second direct current switch, the controllable switch, and the inverter circuit based on the voltage information.

In one embodiment, the motor control unit further includes a third direct current switch, a first terminal of the third direct current switch is connected to the first terminal of the controllable switch, and a second terminal of the third direct current switch is connected to a second input terminal of the inverter circuit. The controller is further configured to: when determining, based on the voltage information, that a voltage provided by the power supply matches a voltage of the power battery pack, or when determining, based on the voltage information, that a voltage required by the load matches a voltage of the power battery pack, control the first direct current switch, the second direct current switch, and the third direct current switch to be closed.

In this case, the power battery pack directly supplies power to the load, or the power supply directly charges the power battery pack.

In one embodiment, the motor control unit further includes a first capacitor. The first capacitor is connected in parallel between the first terminal and the second terminal of the power transmission interface. The first capacitor is used for filtering, to enhance a degree of matching between the two terminals of the power transmission interface.

In one embodiment, the motor control unit further includes a third direct current switch and a fourth direct current switch, a first terminal of the third direct current switch is connected to the first terminal of the controllable switch, and a second terminal of the third direct current switch is connected to a second input terminal of the inverter circuit.

The fourth direct current switch is a single-pole double-throw switch, a first non-movable terminal of the fourth direct current switch is connected to the second terminal of the controllable switch, a second non-movable terminal of the fourth direct current switch is connected to the first input terminal of the inverter circuit, and a movable terminal of the fourth direct current switch is connected to a first terminal of the power battery pack.

The controller is further configured to control working statuses of the third direct current switch and the fourth direct current switch based on the voltage information.

In one embodiment, the motor control unit further includes a fifth direct current switch. The fifth direct current switch is a single-pole double-throw switch, a first non-movable terminal of the fifth direct current switch is connected to the second terminal of the controllable switch, a second non-movable terminal of the fifth direct current switch is connected to a second input terminal of the inverter circuit, and a movable terminal of the fifth direct current switch is connected to a second terminal of the power battery pack.

The controller is further configured to control a working status of the fifth direct current switch based on the voltage information.

In one embodiment, the inverter circuit is a three-phase two-level inverter circuit or a three-phase three-level inverter circuit. The three-phase three-level inverter circuit may be a neutral point clamped three-level inverter circuit or an active neutral point clamped three-level inverter circuit. This is not limited in this application.

The motor control units provided in the first aspect and the second aspect improve applicability, and both can implement boost charging and buck charging for the power battery pack by the power supply, and boost power feeding and buck power feeding for the load by the power battery pack. It may be understood that the foregoing functions may be adjusted based on an actual situation, that is, only some of the functions are included. For example, only boost charging for the power battery pack by the power supply and buck discharge for the power supply by the power battery pack are implemented. Therefore, in some embodiments, the first direct current switch may directly reuse a fast charge contactor of a current electric vehicle, and in this case, high-frequency control is not performed on the first direct current switch. The second direct current switch may directly reuse a direct current switch included in a current power battery pack, and in this case, high-frequency control is not performed on the direct current switch of the power battery pack. In this way, hardware costs of the motor control unit are further reduced.

According to a third aspect, this application further provides an electric drive system. The electric drive system includes the motor control unit provided in the foregoing embodiments, and further includes a direct current-direct current conversion circuit. A first input terminal of the direct current-direct current conversion circuit is connected to the first input terminal of the inverter circuit, a second input terminal of the direct current-direct current conversion circuit is connected to the second input terminal of the inverter circuit, and an output terminal of the direct current-direct current conversion circuit is connected to a low-voltage battery of an electric vehicle.

The direct current-direct current conversion circuit is configured to perform direct current conversion on a high-voltage direct current provided by a power battery pack, to charge the low-voltage battery.

In the electric drive system, the inverter circuit of the motor control unit and a winding of a three-phase motor are reused to implement functions of a boost circuit and a buck circuit without requiring an inductor. This reduces a volume and hardware costs that are required by the motor control unit.

In addition, the electric drive system is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, the solution can be applied in more application scenarios, thereby improving applicability, and the volume and the costs do not greatly increase.

In one embodiment, the controller is further configured to control a working status of the direct current-direct current conversion circuit. That is, the controller is integrated with a controller of the direct current-direct current conversion circuit.

According to a fourth aspect, this application further provides a control method for a motor control unit, used to control the motor control unit provided in the foregoing embodiments, to implement boost charging or buck charging for a power battery pack by a power supply, and boost power feeding or buck power feeding for a load by the power battery pack.

The method includes the following operations:

obtaining voltage information sent by a vehicle control unit of an electric vehicle; and controlling the first direct current switch, the second direct current switch, the controllable switch, and the inverter circuit based on the voltage information, so that a power supply charges a power battery pack when the power transmission interface is connected to the power supply, and the power battery pack discharges electricity into a load when the power transmission interface is connected to the load.

In one embodiment, the controlling the first direct current switch, the second direct current switch, the controllable switch, and the inverter circuit based on the voltage information includes:

when determining, based on the voltage information, that the power transmission interface is connected to the power supply and that a voltage provided by the power supply is less than a voltage of the power battery pack, controlling the first direct current switch and the second direct current switch to be closed, and controlling the controllable switch and the inverter circuit so that the power supply charges two-phase motor windings of a three-phase motor; and controlling the controllable switch and the inverter circuit so that the two-phase motor windings and the power supply are connected in series to charge the power battery pack.

In one embodiment, the controlling the first direct current switch, the second direct current switch, the controllable switch, and the inverter circuit based on the voltage information includes:

when determining, based on the voltage information, that the power transmission interface is connected to the power supply and that a voltage provided by the power supply is greater than a voltage of the power battery pack, first controlling the first direct current switch to be closed and the second direct current switch to be open, and controlling the controllable switch and the inverter circuit so that the power supply charges two-phase motor windings of the three-phase motor; and controlling the first direct current switch to be open and the second direct current switch to be closed, and controlling the controllable switch and the inverter circuit so that the two-phase motor charges the power battery pack.

In one embodiment, the controlling the first direct current switch, the second direct current switch, the controllable switch, and the inverter circuit based on the voltage information includes:

when determining, based on the voltage information, that the power transmission interface is connected to the load and that a voltage required by the load is less than a voltage of the power battery pack, first controlling the first direct current switch and the second direct current switch to be closed, and controlling the controllable switch and the inverter circuit so that the power battery pack supplies power to the load and charges two-phase motor windings of the three-phase motor; and controlling the controllable switch and the inverter circuit so that the two-phase motor windings supply power to the load.

In one embodiment, the controlling the first direct current switch, the second direct current switch, the controllable switch, and the inverter circuit based on the voltage information includes:

when determining, based on the voltage information, that the power transmission interface is connected to the load and that a voltage required by the load is greater than a voltage of the power battery pack, first controlling the first direct current switch to be open and the second direct current switch to be closed, and controlling the controllable switch and the inverter circuit so that the power battery pack charges two-phase motor windings of the three-phase motor; and controlling the first direct current switch to be closed and the second direct current switch to be open, and controlling the controllable switch and the inverter circuit so that the two-phase motor windings supply power to the load.

In one embodiment, the method further includes the following operation:

controlling the controllable switch and the inverter circuit based on a preset time to switch a motor winding that accesses a loop.

In one embodiment, the method further includes the following operation:

controlling the controllable switch and the inverter circuit based on obtained temperature information of motor windings to switch a motor winding that accesses a loop.

According to a fifth aspect, this application further provides a powertrain. The powertrain includes the motor control unit provided in any one of the foregoing embodiments, and further includes a three-phase motor. The output of the motor control unit is connected to the three-phase motor.

The three-phase motor is configured to convert electric energy into mechanical energy to drive an electric vehicle.

A winding of the three-phase motor and the inverter circuit of the powertrain are reused when a power battery pack is charged or the power battery pack discharges electricity into a load, without requiring an inductor. This reduces a volume and hardware costs that are required by the motor control unit. In addition, the powertrain is applicable to a plurality of scenarios such as charging performed on a power battery pack by an external power supply, and discharge performed on an external load by the power battery pack. Therefore, application scenarios are extended and applicability is improved.

According to a sixth aspect, this application further provides an electric vehicle. The electric vehicle includes the powertrain provided in the foregoing embodiment, and further includes a power battery pack. A first output terminal of the power battery pack is connected to the first input terminal of the inverter circuit, and a second output terminal of the power battery pack is connected to the second input terminal of the inverter circuit. The power battery pack is configured to provide a direct current for the powertrain.

In the electric vehicle provided in this embodiment of this application, the inverter circuit of the motor control unit and the winding of the three-phase motor are reused. The controller controls the first direct current switch, the second direct current switch, the controllable switch, and the controllable switching transistor in the inverter circuit, to implement functions of a boost circuit and a buck circuit without requiring an inductor. This reduces and a volume and hardware costs that are required by the motor control unit.

In addition, the electric vehicle is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended, and applicability is improved.

DESCRIPTION OF EMBODIMENTS

To make a person skilled in the art better understand technical solutions provided in embodiments of this application, the following first describes application scenarios of this application.

With the popularization of electric vehicles, different types of electric vehicles may use power battery packs with different voltages, and correspondingly, direct current charging piles with different output voltages are required. In an actual use scenario of an electric vehicle, it is desirable that an output voltage of a direct current charging pile matches a voltage of a power battery pack, but a scenario in which a high-voltage charging pile charges a low-voltage power battery pack, or a scenario in which a low-voltage charging pile charges a high-voltage power battery pack may inevitably occur. This requires that a charging circuit of the power battery pack can adapt to different input voltages.

On the other hand, as V2V technologies and V2G technologies continuously mature, a scenario in which a high-voltage power battery pack charges a low-voltage power battery pack or a low-voltage direct current power grid, and a scenario in which a low-voltage power battery pack charges a high-voltage power battery pack or a high-voltage direct current power grid may also occur accordingly. This requires that a charging circuit of the power battery pack can implement boost discharge and boost charging for the power battery pack.

Figure 1:
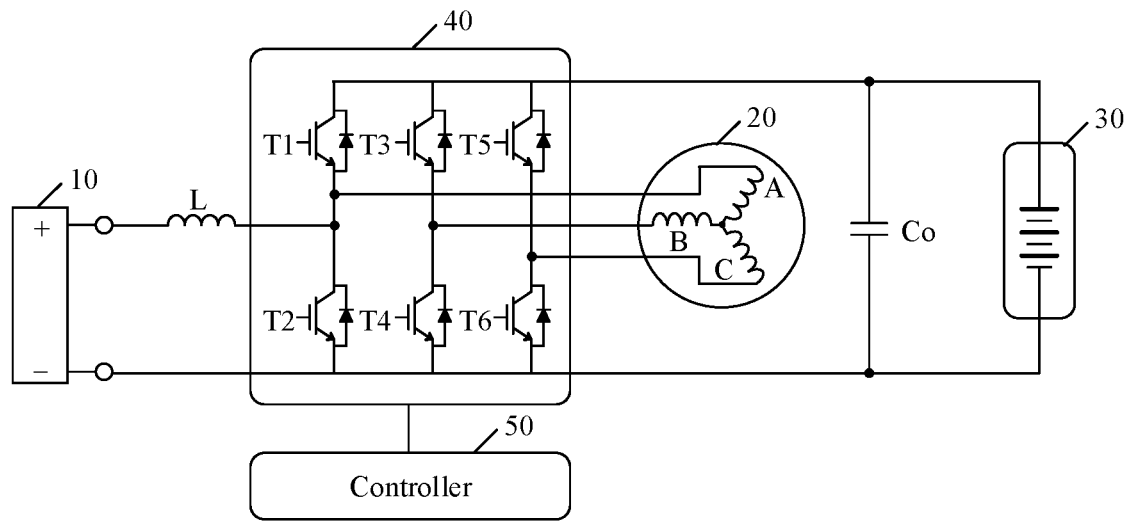
FIG. 1 is a schematic diagram of a boost charging solution in a conventional technology.

However, a current charging circuit of a power battery pack has a single application scenario. The following provides a description with reference to a boost charging solution shown in FIG. 1.

A motor control unit of an electric vehicle includes an inverter circuit 40 and a controller 50. The controller 50 is configured to control a working status of the inverter circuit 40. The inverter circuit 40 is a three-phase two-level inverter circuit.

An output terminal of the inverter circuit 40 is connected to a motor 20. The motor 20 is a three-phase motor, and three-phase windings of the motor are respectively denoted by A, B, and C.

When an output voltage of a direct current charging pile 10 is less than a voltage of a power battery pack 30, boost conversion is implemented in the illustrated solution, so that the low-voltage charging pile 10 charges the high-voltage power battery pack 30.

However, this solution requires an inductor L, which increases a volume and hardware costs of the motor control unit. In addition, the solution is inapplicable to other scenarios such as buck charging of the power battery pack 30.

To resolve the foregoing problems, this application provides a motor control unit, an electric drive system, a powertrain, a control method, and an electric vehicle, to reuse an inverter circuit of the motor control unit and a motor winding without requiring an inductor, thereby reducing a volume and hardware costs that are required by the motor control unit. In addition, the motor control unit, the electric drive system, the powertrain, the control method, and the electric vehicle are applicable to a plurality of scenarios such as boost charging or buck charging performed on a power battery pack by a power supply, and boost discharge or buck discharge performed on an external load by the power battery pack. Therefore, application scenarios are extended and applicability is improved.

The following describes in detail the technical solutions in this application with reference to accompanying drawings.

In the following description of this application, terms such as "first" and "second" are used only for description purposes, and cannot be understood as indicating or implying relative importance or implicitly indicating a quantity of indicated technical features.

In the following description and the accompanying drawings, a positive electrode of a power battery pack is a first terminal of the power battery pack, and a negative electrode of the power battery pack is a second terminal of the power battery pack.

In this application, unless otherwise expressly specified and limited, a term "connection" should be understood in a broad sense. For example, the "connection" may be a fixed connection, a detachable connection, or an entirety; and may be a direct connection, or an indirect connection using an intermediate medium.

Figure 2:
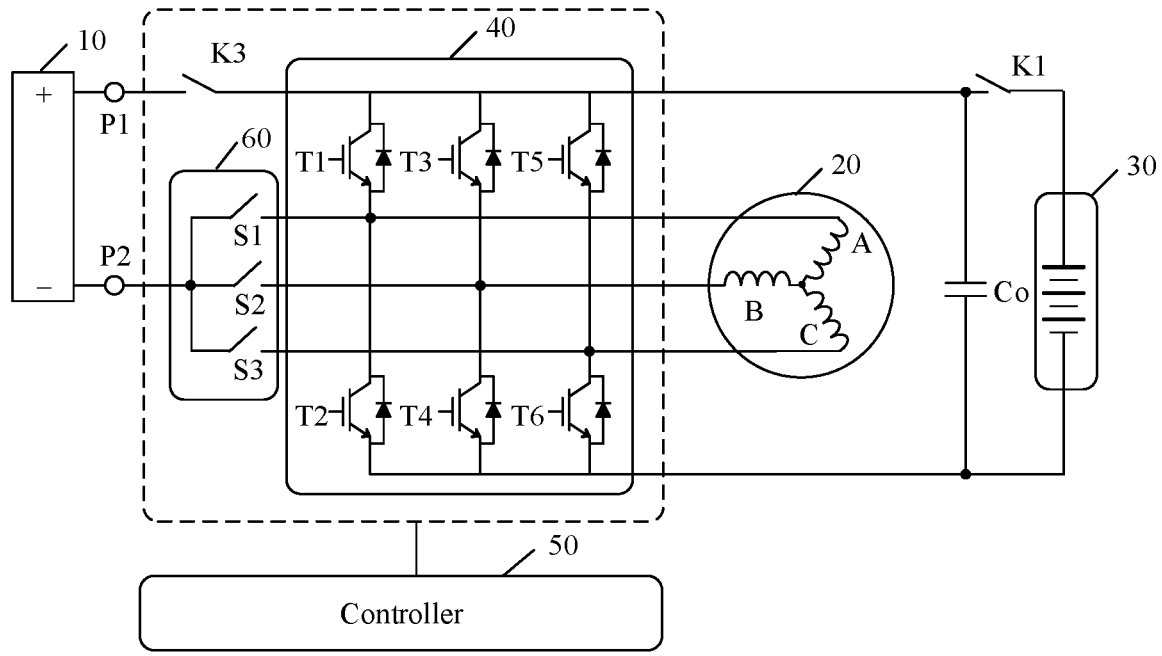
FIG. 2 is a schematic diagram of a motor control unit according to an embodiment of this application.

FIG. 2 is a schematic diagram of a motor control unit according to an embodiment of this application.

An input of the motor control unit is connected to a power battery pack 30 of an electric vehicle, and an output of the motor control unit is connected to a three-phase motor 20.

The motor control unit includes an inverter circuit 40, a power transmission interface (P1 and P2), a controller 50, a first direct current switch K3, a second direct current switch K1, and a switch circuit 60.

A first terminal P1 of the power transmission interface is connected to a first input terminal of the inverter circuit 40 by using the first direct current switch K3, and a second terminal P2 of the power transmission interface is connected to a first terminal of the switch circuit 60.

The switch circuit 60 includes three switch branches, where first terminals of the three switch branches are connected to the first terminal of the switch circuit 60, second terminals of the three switch branches are respectively connected to one-phase output terminals of the inverter circuit 40, and each switch branch includes a controllable switch. Controllable switches in the figure are respectively denoted by S1, S2, and S3.

An output terminal of the inverter circuit 40 is connected to the three-phase motor 20, and windings of the three-phase motor 20 are respectively denoted by A, B, and C. An each-phase output terminal of the inverter circuit 40 is connected to one winding.

For example, the inverter circuit 40 is a three-phase two-level inverter circuit. A bridge arm midpoint of each inverter bridge arm of the inverter circuit 40 is a one-phase output terminal. That is, each bridge arm midpoint is connected to one winding and one switch branch.

The second direct current switch K1 is connected between the input terminal of the inverter circuit 40 and the power battery pack 30. K1 may be connected to a positive electrode or a negative electrode of the power battery pack. This is not limited in this embodiment of this application.

The controller 50 is configured to control the first direct current switch K3, the second direct current switch K1, the controllable switches S1, S2, and S3, and the inverter circuit 40. The inverter circuit and the motor winding are reused to form a boost circuit or a buck circuit, so that the power battery pack 30 may be charged when the power transmission interface is connected to a high-voltage direct current power supply or a low-voltage direct current power supply; and the power battery pack 30 may normally perform reverse charging when the power transmission interface is connected to a high-voltage power grid, a low-voltage power grid, a high-voltage load (for example, a high-voltage power battery pack of another electric vehicle), or a low-voltage load (for example, a low-voltage power battery pack of another electric vehicle).

The controller 50 in this embodiment may be an ASIC, a PLD, a DSP, or a combination of the ASIC, the PLD, and the DSP.

The PLD may be a CPLD, an FPGA, a GAL, or any combination of the CPLD, the FPGA, and the GAL. This is not limited in this embodiment of this application.

The inverter circuit includes a controllable switching transistor. A type of the controllable switching transistor is not limited in this embodiment of this application, for example, may be an IGBT, a MOSFET (referred to as a MOS transistor, including two specific types PMOS and NMOS), or a SiC MOSFET.

The first direct current switch K3, the second direct current switch K1, and the controllable switches S1, S2, and S3 may be controllable switching transistors, and types of the controllable switching transistors may be the same as or different from types of T1 to T6. This is not limited in this embodiment of this application.

In one embodiment, the first direct current switch K3, the second direct current switch K1, the controllable switches S1, S2, and S3, and the controllable switching transistor in the inverter circuit are of a same type.

The controller 50 may send a control signal to the controllable switching transistor to control an on-off status of the controllable switching transistor. In some embodiments, the control signal is a PWM signal.

The controller 50 may further adjust a duty cycle value of the PWM signal to adjust a charging voltage when the power battery pack 30 is charged and a discharge voltage when the power battery pack 30 charges an external load.

In conclusion, in the solution provided in this embodiment of this application, the inverter circuit of the motor control unit and the motor winding are reused to form the boost circuit without requiring an inductor, thereby reducing a volume and hardware costs that are required by the motor control unit. In addition, the solution is applicable to a plurality of scenarios such as charging performed on a power battery pack by an external power supply, and discharge performed on an external load by the power battery pack. Therefore, application scenarios are extended and applicability is improved.

To enable a person skilled in the art to better understand a working principle of the motor control unit, the following uses an example in which the inverter circuit 40 is a three-phase two-level inverter circuit for description. When the inverter circuit is a three-phase three-level inverter circuit, a principle is similar, and details are not described herein in this embodiment.

In this case, the inverter circuit includes controllable switching transistors T1 to T6. T1 and T2 are located on a first bridge arm, T3 and T4 are located on a second bridge arm, and T5 and T6 are located on a third bridge arm.

Figure 3:
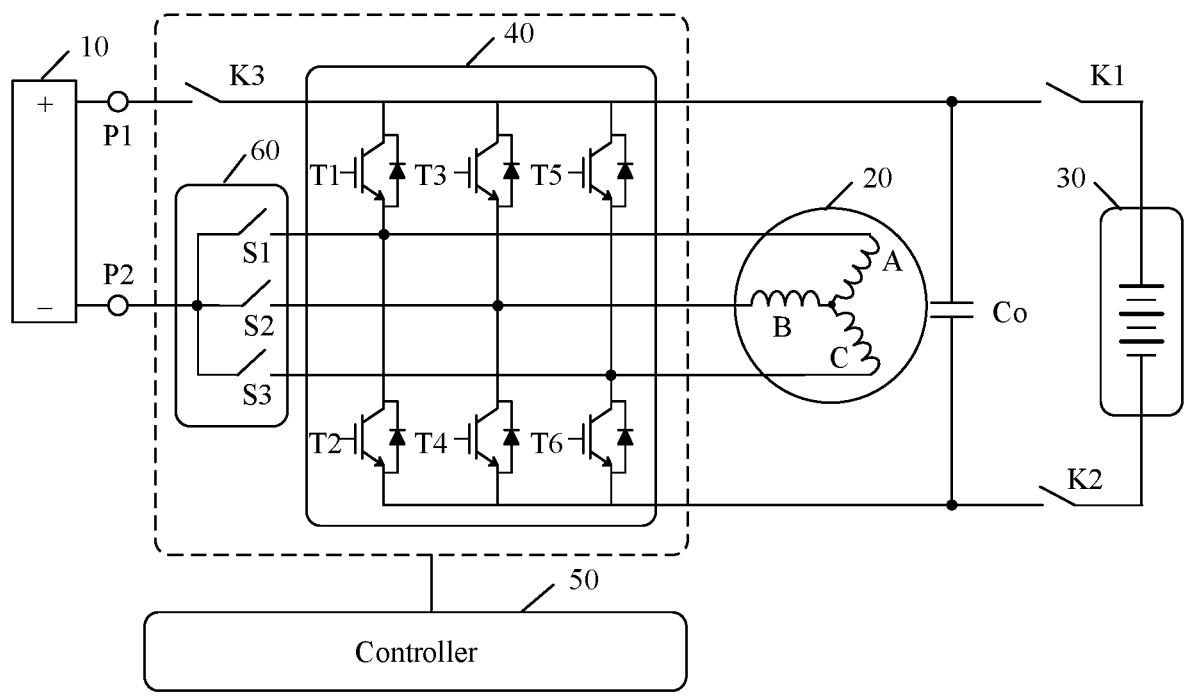
FIG. 3 is a schematic diagram of another motor control unit according to an embodiment of this application.

FIG. 3 is a schematic diagram of another motor control unit according to an embodiment of this application.

K1 is a second direct current switch, and K3 is a first direct current switch. K2 is a redundantly disposed direct current switch, and is controlled by using a same control signal as K1. In actual application, K2 may alternatively be canceled.

The following first describes a working principle when a power transmission interface is connected to a direct current power supply. A description is provided by using an example in which a positive output terminal of a direct current power supply 10 is connected to P1 and a negative output terminal of the direct current power supply 10 is connected to P2.

After controlling K1, K2, S2, and K3 to be closed and controlling S1 and S3 to be open, a controller first controls T1 to be turned on. For a status of the motor control unit in this case, refer to FIG. 4a.

In this case, a current sequentially passes through K3, T1, a motor winding A, a motor winding B, and S2 to form a closed loop, and the direct current power supply supplies energy to the motor winding A and the motor winding B for storage.

The controller then controls T1 to be turned off. In this case, the current passes through the motor winding A, the motor winding B, S2, the direct current power supply 10, K3, K1, a power battery pack 30, K2, and an anti-parallel connected diode of T2 to form a closed loop. For the status of the motor control unit in this case, refer to FIG. 5. The motor winding A, the motor winding B, and the direct current power supply 10 are connected in series to charge the power battery pack 30.

A bridge arm of an inverter circuit and a winding of a three-phase motor are reused to form a boost circuit. When a voltage provided by the direct current power supply 10 is less than a voltage of the power battery pack 30, the direct current power supply 10 can still continue to charge the power battery pack 30 by using the boost circuit.

In some embodiments, the controller can adjust a charging voltage of the power battery pack 30 by controlling a duty cycle of a control signal of T1.

In the foregoing description, for example, K1 and K2 are kept normally closed, and no high-frequency on-off action is performed, so that a control signal can be simplified and control efficiency can be improved.

In some other embodiments, alternatively, when the motor winding A and the motor winding B store energy, K1 and K2 may be controlled to be turned off; and when the motor winding A and the motor winding B discharge, K1 and K2 may be controlled to be closed.

When determining that the voltage provided by the power supply 10 is greater than the voltage of the power battery pack 30, and after controlling S2 and K3 to be closed and controlling K1, K2, S1, and S3 to be open, the controller first controls T1 to be turned on. For the status of the motor control unit, refer to FIG. 4b.

In this case, the current sequentially passes through K3, T1, the motor winding A, the motor winding B, and S2 to form a closed loop, and the direct current power supply supplies energy to the motor winding A and the motor winding B for storage.

After energy storage of the motor winding A and the motor winding B is completed, the controller controls K3 to be open and controls K1 and K2 to be closed. In this case, the current passes through the motor winding A, the motor winding B, an anti-parallel connected diode of T3, K1, the power battery pack 30, K2, and the anti-parallel connected diode of T2 to form a closed loop. For the status of the motor control unit, refer to FIG. 6, and buck charging of the power battery pack 30 can be implemented.

The controller can adjust the charging voltage of the power battery pack 30 by adjusting the duty cycle of the control signal of T1.

The following describes a working principle when the power transmission interface is connected to a load. A load 10 may be a direct current power grid, or a power battery pack of another electric vehicle. This is not limited in this embodiment of this application.

After controlling K1, K2, K3, and S2 to be closed and controlling S1 and S3 to be open, the controller first controls T2 to be turned on. In this case, the power battery pack 30 discharges. For the status of the motor control unit, refer to FIG. 7.

A closed loop is formed after a current sequentially passes through K1, K3, the load 10, S2, a phase-B winding of the motor, a phase-A winding of the motor, T2, and K2. The power battery pack 30 not only supplies power to the load 10, but also supplies energy to the phase-B winding of the motor and the phase-A winding of the motor for storage. The load 10 divides the voltage to obtain a partial voltage of the power battery pack 30.

The controller then controls T2 to be turned off. For the status of the motor control unit, refer to FIG. 8. In this case, the current passes through an anti-parallel connected diode of T1, K3, the load, and S2 to form a closed loop. The phase-B winding of the motor and the phase-A winding of the motor are connected in series to supply power to the load.

In the foregoing description, for example, K1 and K2 are kept normally closed, and no high-frequency on-off action is performed, so that a control signal can be simplified and control efficiency can be improved.

In this case, the bridge arm of the inverter circuit and the winding of the three-phase motor are reused to form a buck circuit. When a voltage required by the load 10 is less than the voltage of the power battery pack 30, the power battery pack 30 can still continue to supply power to the load 10 by using the buck circuit.

In some embodiments, the controller can adjust, by controlling a duty cycle of a control signal of T2, a voltage that is output to the load 10.

In some other embodiments, when the voltage required by the load 10 is greater than the voltage of the power battery pack 30, the controller controls K3 to be open, controls K1 and K2 to be closed, controls S2 to be closed, and controls S1 and S3 to be open. Then, the controller first controls T2 and T3 to be turned on. For the status of the motor control unit in this case, refer to FIG. 9.

In this case, the power battery pack 30 supplies energy to the phase-B winding of the motor and the phase-A winding of the motor for storage, and the current sequentially passes through K1, T3, the phase-B winding of the motor, the phase-A winding of the motor, T2, and K2 to form a closed loop.

The controller then controls T3, K1, and K2 to be turned off, maintains T2 to be turned on, and controls K3 to be closed. For the status of the motor control unit in this case, refer to FIG. 10. The current sequentially passes through the anti-parallel connected diode of T1, K3, the load 10, S2, the phase-B winding of the motor, and the phase-A winding of the motor to form a closed loop. The motor winding A, the motor winding B, and the power battery pack 30 are connected in series to charge the load 10.

The bridge arm of the inverter circuit and the winding of the three-phase motor are reused to form a boost circuit. When the voltage required by the load 10 is greater than the voltage of the power battery pack 30, the power battery pack 30 can still supply power to the load 10 by using the boost circuit.

In some embodiments, the controller can adjust, by controlling duty cycles of control signals of T2 and T3, the voltage that is output to the load 10.

A voltage Vb of the power battery pack 30 is a known configuration parameter. A VCU of an electric vehicle obtains a voltage Vn of the power supply connected to the power transmission interface or a voltage Vn corresponding to the load. The VCU compares a value of Vn with a value of Vb to obtain voltage information, and transmits the voltage information to the controller, so that the controller controls a third direct current switch, a fourth direct current switch, a controllable switch, and the inverter circuit based on the voltage information.

In some embodiments, when the power transmission interface is connected to a direct current charging pile, the VCU may receive a voltage parameter sent by the direct current charging pile. In this case, the voltage parameter represents a direct current voltage that is output by the direct current charging pile, or an input voltage of the direct current charging pile.

When the power transmission interface is connected to another electric vehicle, the VCU may receive a voltage parameter sent by the another electric vehicle. In this case, the voltage parameter represents a voltage that is output by a power battery pack of the another electric vehicle, or a charging voltage of the power battery pack of the another electric vehicle. The VCU determines Vn based on the obtained voltage parameter.

The VCU compares the value of Vn with the value of Vb to obtain the voltage information, and transmits the voltage information to the controller, so that the controller controls the controllable switch and the inverter circuit based on the voltage information.

It may be understood that, in the foregoing description, an example in which the controller controls S2 to be closed and controls S1 and S3 to be open is used for description. In this case, the motor winding A and the motor winding B of the three-phase motor are reused.

In some other embodiments, the controller may alternatively control S1 to be closed and control S2 and S3 to be open, to reuse the motor winding A and a motor winding C of the three-phase motor; or may control S3 to be closed to reuse the motor winding B and the motor winding C of the three-phase motor.

In some embodiments, to avoid reusing same two motor windings for a long time, S1, S2, and S3 may be closed in turn, to average reuse times of the three windings. This may prolong service lives of the windings and facilitate temperature control.

In some embodiments, a temperature of a motor winding may be detected by using a temperature sensor. When the temperature exceeds a preset temperature threshold, the controller switches a closed controllable switch, to replace the reused motor winding. The preset temperature threshold is not limited in this embodiment of this application.

In some other embodiments, a closing time length of each controllable switch in a switch circuit is preset, and the reused motor winding is replaced based on the time length.

In conclusion, in the solution provided in this embodiment of this application, the inverter circuit of the motor control unit and the winding of the three-phase motor are reused to implement functions of the boost circuit and the buck circuit without requiring an inductor. This reduces a volume and hardware costs that are required by the motor control unit.

In addition, the solution is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, the solution can be applied in more application scenarios, thereby improving applicability, and the volume and the costs do not greatly increase.

The following describes another embodiment of the motor control unit.

Figure 11:
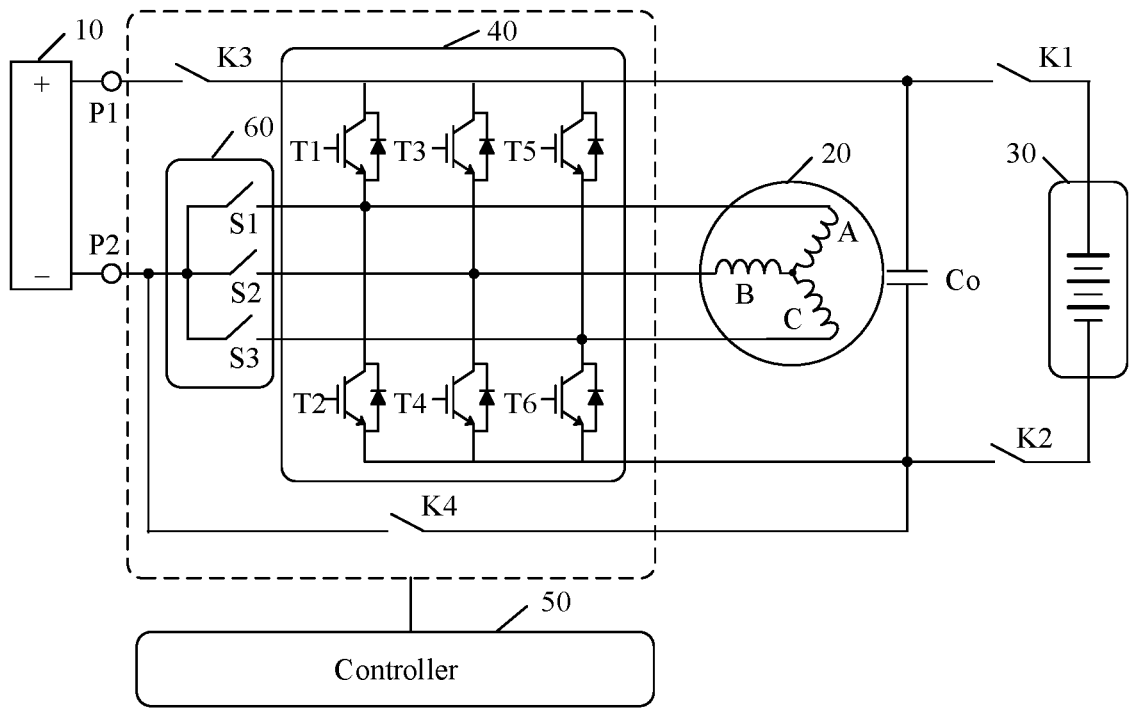
FIG. 11 is a schematic diagram of still another motor control unit according to an embodiment of this application.

FIG. 11 is a schematic diagram of still another motor control unit according to an embodiment of this application.

A difference between the illustrated motor control unit and the motor control unit shown in FIG. 2 lies in that the motor control unit further includes a third direct current switch K4, a first terminal of the third direct current switch K4 is connected to the first terminal of the switch circuit 60, and a second terminal of the third direct current switch K4 is connected to a second input terminal of the inverter circuit 40.

The controller 50 selects a charge/discharge mode by controlling the third direct current switch K4, as described in detail below.

When the power transmission interface is connected to a direct current charging pile for charging, a VCU obtains an output voltage Vn of the direct current charging pile, and compares a value of Vn with a value of a voltage Vb of the power battery pack 30 to obtain voltage information. The VCU transmits the voltage information to the controller 50, so that the controller 50 controls the controllable switch and the inverter circuit based on the voltage information.

In one embodiment, when the controller determines, based on the voltage information, that Vn matches Vb, the controller controls the third direct current switch K4, K1, K2, and K3 to be closed. In this case, the direct current charging pile directly charges the power battery pack 30.

When determining that Vn is greater than Vb, the VCU sends voltage information to the controller 50, and the controller 50 controls K4 to be open, and controls K1, K2, K3, the switch circuit 60, and the inverter circuit 40 based on the voltage information, to form a buck circuit to charge the power battery pack 30. For a particular control manner, refer to the related description in the embodiment corresponding to FIG. 3, and details are not described herein in this embodiment.

When determining that Vn is less than Vb, the VCU sends voltage information to the controller 50, and the controller 50 controls K4 to be open, and controls K1, K2, K3, the switch circuit 60, and the inverter circuit 40 based on the voltage information, to form a boost circuit to charge the power battery pack 30. For a particular control manner, refer to the related description in the embodiment corresponding to FIG. 3, and details are not described herein in this embodiment.

When the power battery pack performs reverse power feeding for a load or a direct current power grid, the VCU may receive a voltage parameter sent by the direct current power grid, and in this case, the voltage parameter represents an input voltage of a direct current charging pile.

When the power transmission interface is connected to another electric vehicle, the VCU may receive a voltage parameter sent by the another electric vehicle. In this case, the voltage parameter represents a charging voltage of the power battery pack of the another electric vehicle.

The VCU determines Vn based on the obtained voltage parameter. The VCU compares the value of Vn with the value of Vb to obtain the voltage information, and transmits the voltage information to the controller.

When the controller determines, based on the voltage information, that Vb matches Vn, the controller controls the third direct current switch K4, K1, K2, and K3 to be closed. In this case, the power battery pack 30 directly charges the direct current charging pile.

When the controller determines, based on the voltage information, that Vb is greater than Vn, the controller 50 controls K4 to be open, and controls K1, K2, K3, the switch circuit 60, and the inverter circuit 40 based on the voltage information, to form a buck circuit to charge the direct current charging pile.

When the controller determines, based on the voltage information, that Vb is less than Vn, the controller 50 controls K4 to be open, and controls K1, K2, K3, the switch circuit 60, and the inverter circuit 40 based on the voltage information, to form a boost circuit to charge the direct current charging pile.

For a particular working principle of the controller 50, refer to the foregoing related description in the embodiment corresponding to FIG. 3, and details are not described herein.

Figure 12:
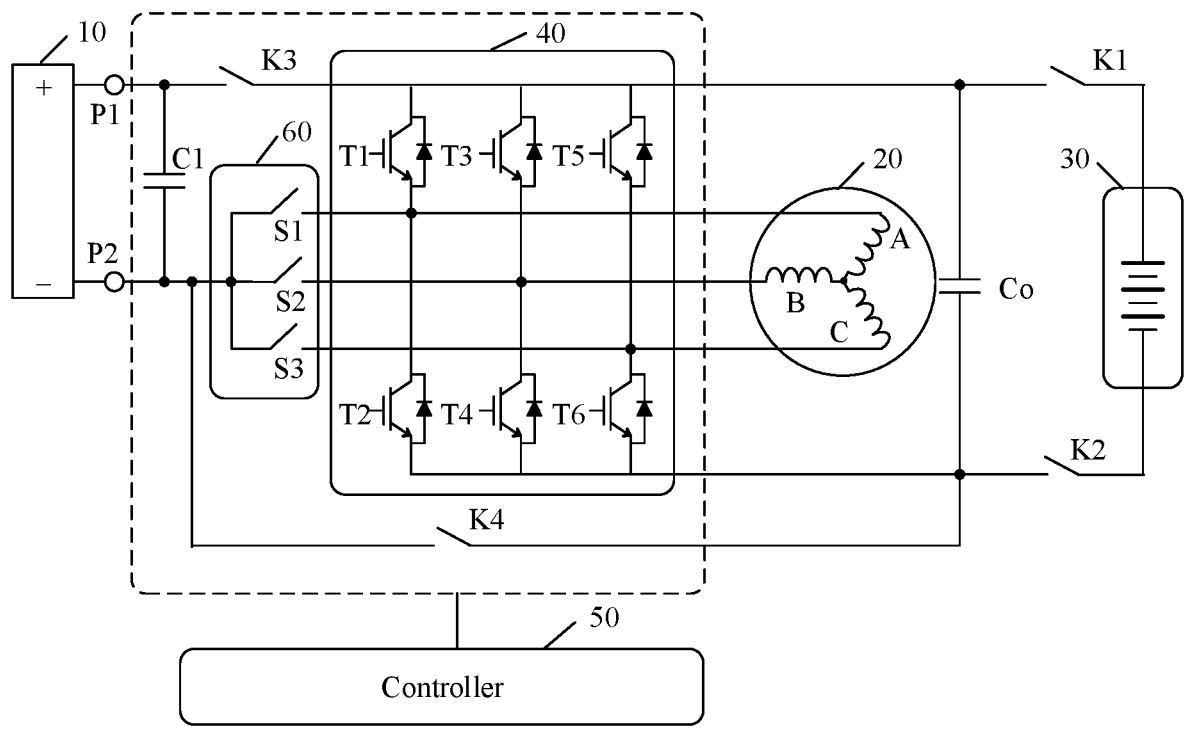
FIG. 12 is a schematic diagram of yet another motor control unit according to an embodiment of this application.

FIG. 12 is a schematic diagram of yet another motor control unit according to an embodiment of this application.

A difference between the illustrated motor control unit and the motor control unit shown in FIG. 11 lies in that a first capacitor C1 is added between the first terminal and the second terminal of the power transmission interface, and the first capacitor C1 is used for filtering, so that better matching can be performed between the two sides.

The solutions shown in FIG. 11 and FIG. 12 may be configured separately or jointly.

In conclusion, in the solution provided in this embodiment of this application, the inverter circuit of the motor control unit and the winding of the three-phase motor are reused to implement functions of a both-way boost circuit and a both-way buck circuit without requiring an inductor, thereby reducing a volume and hardware costs that are required by the motor control unit. The solution is applicable to a plurality of scenarios, thereby extending application scenarios and improving applicability, and the volume and the costs do not greatly increase.

The following describes still another embodiment of the motor control unit.

Figure 13:
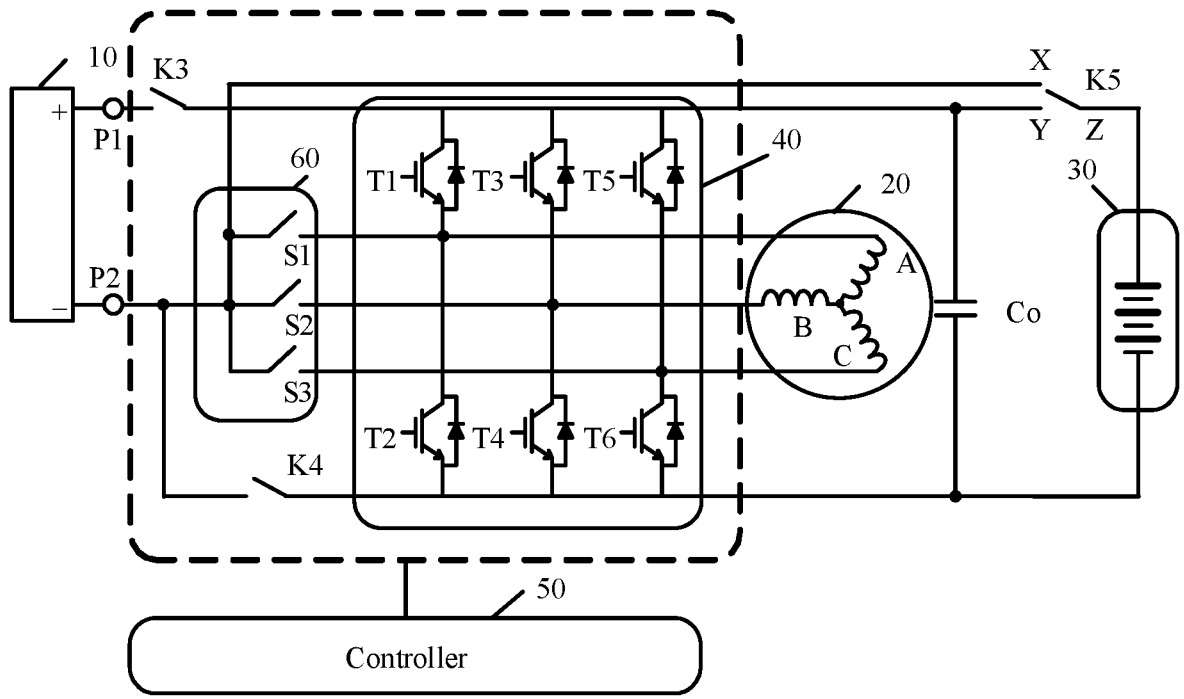
FIG. 13 is a schematic diagram of another motor control unit according to an embodiment of this application.

FIG. 13 is a schematic diagram of another motor control unit according to an embodiment of this application.

A difference between the illustrated motor control unit and the motor control unit shown in FIG. 11 lies in that the motor control unit further includes a fourth direct current switch K5.

The fourth direct current switch K5 is a single-pole double-throw switch, a first non-movable terminal X of the fourth direct current switch K5 is connected to the first terminal of the switch circuit 60, a second non-movable terminal Y of the fourth direct current switch K5 is connected to the first input terminal of the inverter circuit 40, and a movable terminal Z of the fourth direct current switch K5 is connected to the power battery pack 30.

In the following description, the second direct current switch K1 (not shown in the figure) is connected in series between the movable terminal Z and the power battery pack 30, or is connected in series between the inverter circuit 40 and the second non-movable terminal Y.

In this case, K3 may directly reuse a fast charge contactor of the electric vehicle, with no need to be a new controllable switching transistor.

The controller 50 is configured to control the fourth direct current switch K5, as described in detail below.

The following provides a description by using an example in which the power transmission interface is connected to a direct current charging pile. When the power transmission interface is connected to a power battery pack of another electric vehicle, a principle is similar, and details are not described herein. The motor control unit has the following working modes:

a. When the controller determines, based on the voltage information, that a voltage of a direct current charging pile 10 matches the voltage of the power battery pack 30, the controller controls K3 and K4 to be closed, and controls the movable terminal Z of K5 to be connected to the second non-movable terminal Y. In this case, the direct current charging pile 10 and the power battery pack 30 may directly perform charging and discharging for each other.

b. When the controller determines, based on the voltage information, that the voltage of the direct current charging pile 10 is less than the voltage of the power battery pack 30, the controller controls K4 to be open, and controls the movable terminal Z of K5 to be connected to the second non-movable terminal Y. In this case, embodiments of the motor control unit shown in FIG. 13 and the motor control unit shown in FIG. 11 are the same.

Figure 4A:
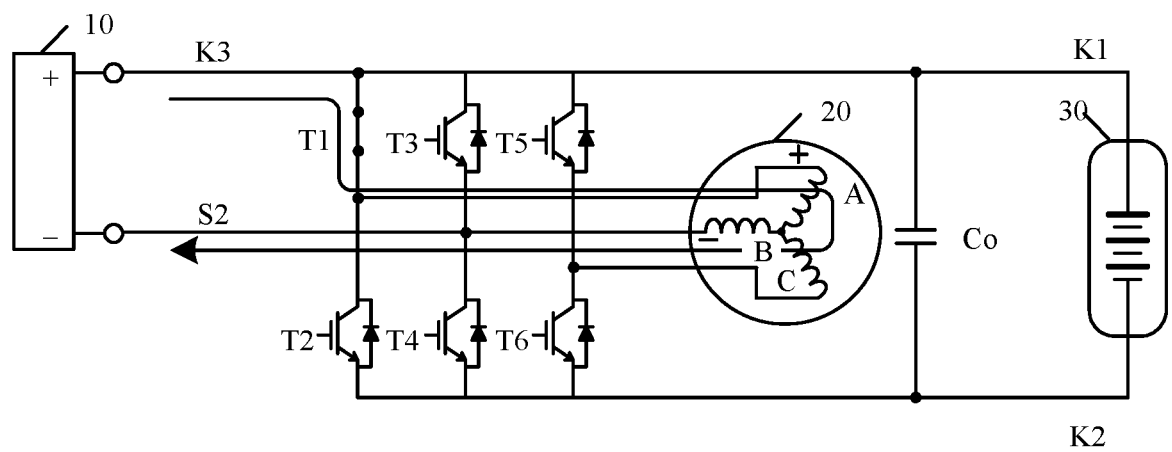
FIG. 4a is a schematic status diagram 1 of the motor control unit corresponding to FIG. 3.
Figure 5:
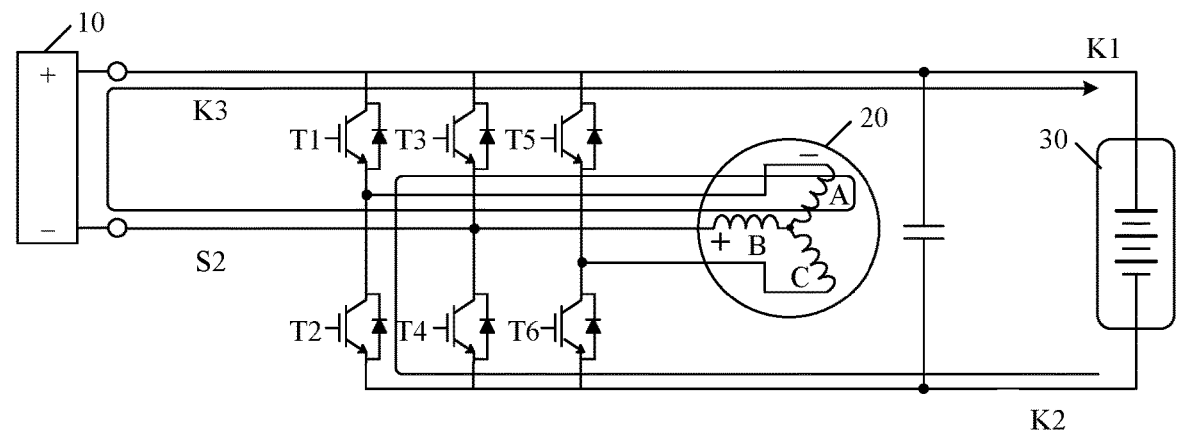
FIG. 5 is a schematic status diagram 3 of the motor control unit corresponding to FIG. 3.

For a particular principle in which the direct current charging pile 10 charges the power battery pack 30, refer to the descriptions corresponding to FIG. 4a and FIG. 5. In this case, two motor windings connected in series and a bridge arm of the inverter circuit form a boost circuit, and the direct current charging pile 10 charges the power battery pack 30 by using the boost circuit.

Figure 4B:
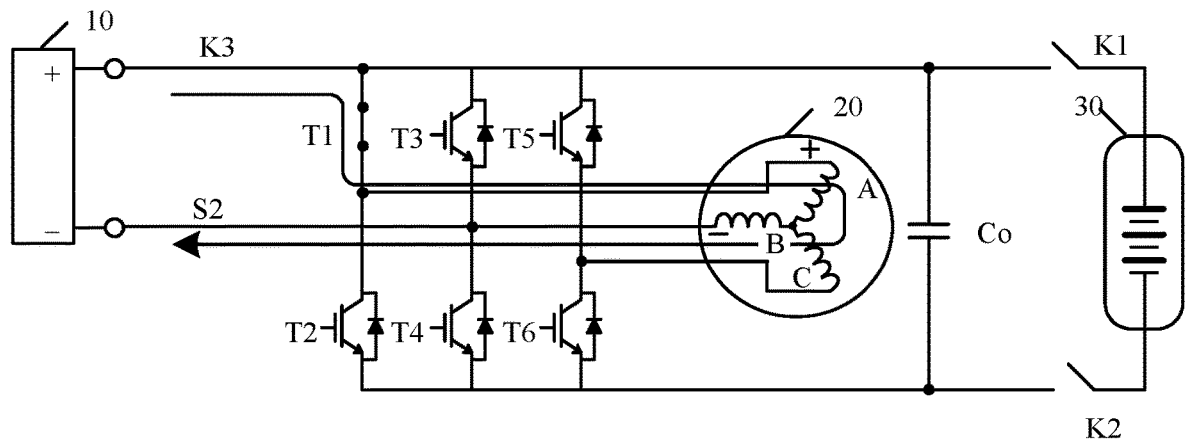
FIG. 4b is a schematic status diagram 2 of the motor control unit corresponding to FIG. 3.
Figure 6:
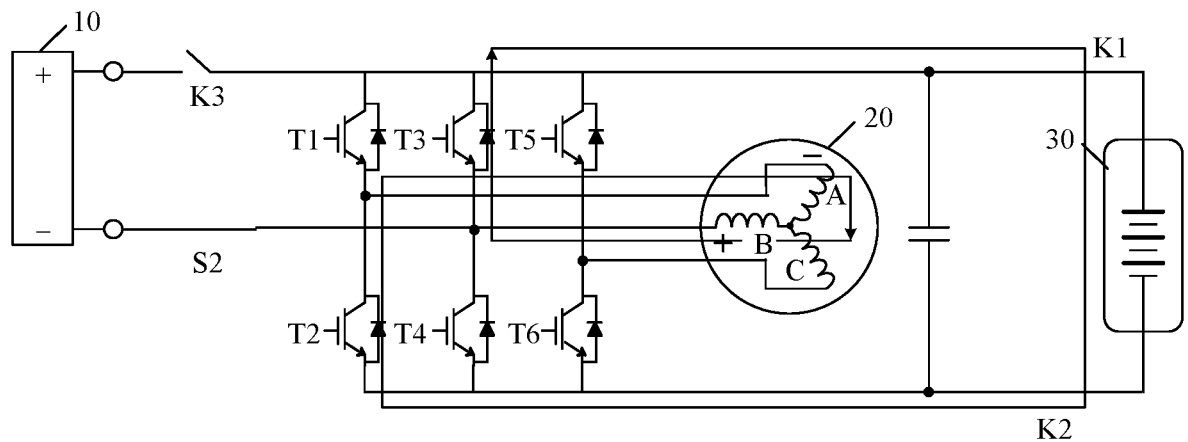
FIG. 6 is a schematic status diagram 4 of the motor control unit corresponding to FIG. 3.

For a particular principle in which the direct current charging pile 10 charges the power battery pack 30, refer to the descriptions corresponding to FIG. 4b and FIG. 6. In this case, two motor windings connected in series and a bridge arm of the inverter circuit form a buck circuit, and the direct current charging pile 10 charges the power battery pack 30 by using the buck circuit.

Figure 7:
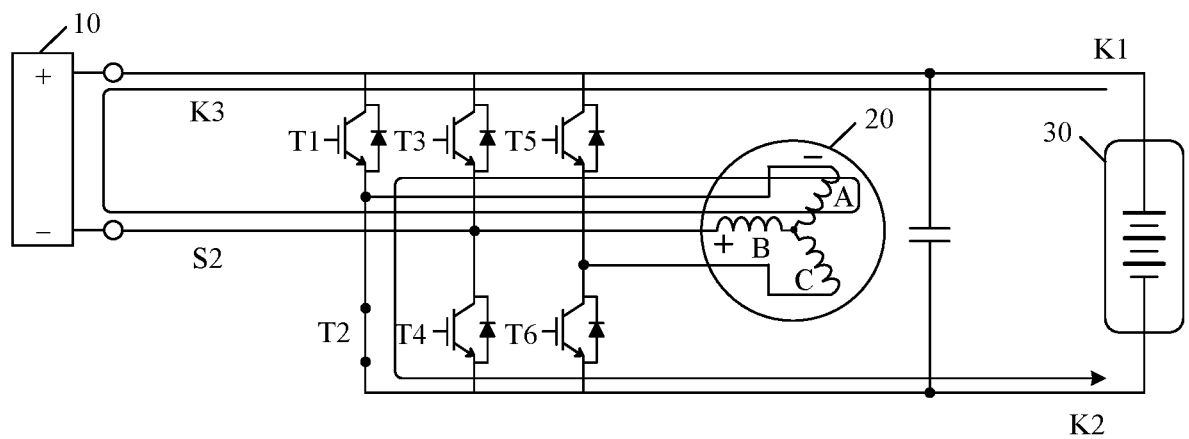
FIG. 7 is a schematic status diagram 5 of the motor control unit corresponding to FIG. 3.
Figure 8:
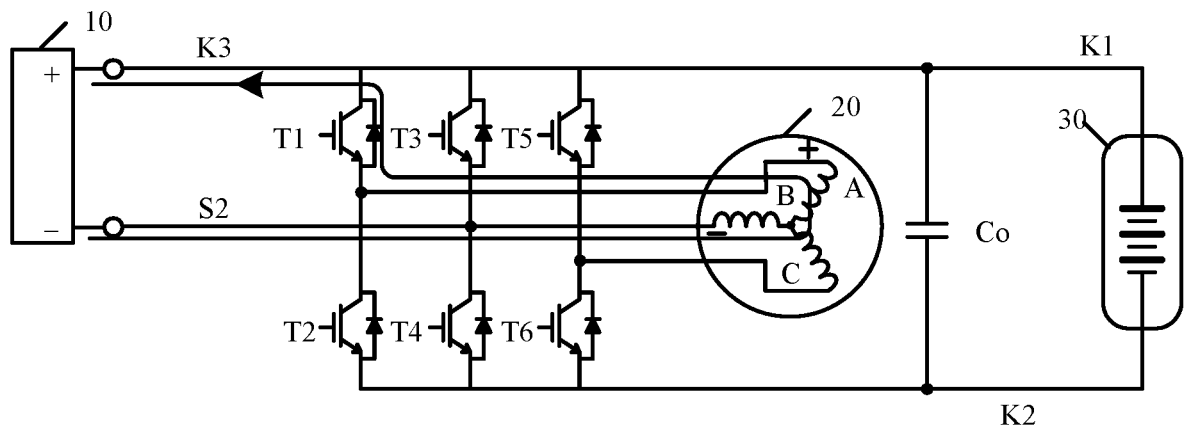
FIG. 8 is a schematic status diagram 6 of the motor control unit corresponding to FIG. 3.

For a particular principle in which the power battery pack 30 charges a load or a direct current power grid, refer to the descriptions corresponding to FIG. 7 and FIG. 8. In this case, a bridge arm of the inverter circuit and two motor windings connected in series form a buck circuit, and the power battery pack 30 charges the load or the direct current power grid by using the buck circuit.

Figure 9:
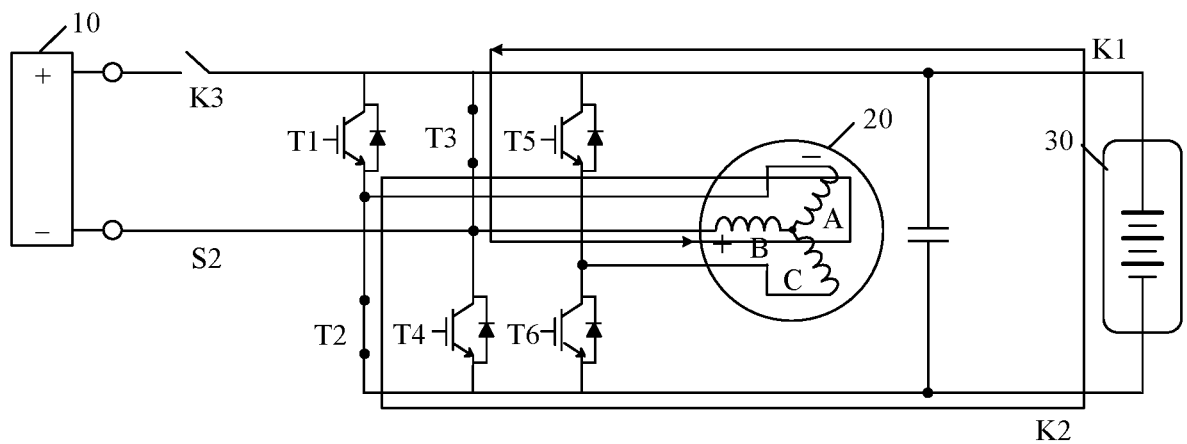
FIG. 9 is a schematic status diagram 7 of the motor control unit corresponding to FIG. 3.
Figure 10:
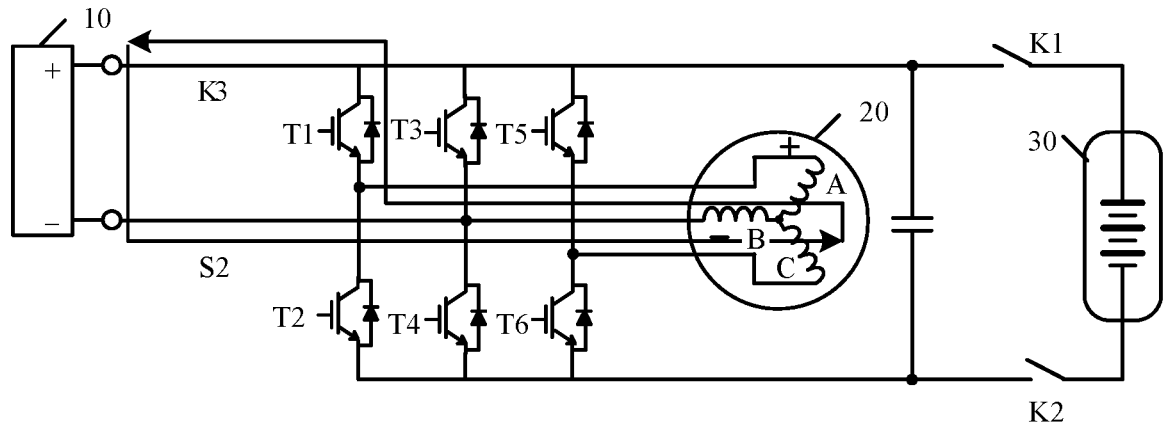
FIG. 10 is a schematic status diagram 8 of the motor control unit corresponding to FIG. 3.

For a particular principle in which the power battery pack 30 charges a load or a direct current power grid, refer to the descriptions corresponding to FIG. 9 and FIG. 10. In this case, a bridge arm of the inverter circuit and two motor windings connected in series form a boost circuit, and the power battery pack 30 charges the load or the direct current power grid by using the boost circuit.

In some embodiments, the motor control unit shown in FIG. 13 further includes a sixth direct current switch (referred to as S4 below), a first terminal of the sixth direct current switch S4 is connected to the first terminal of the third direct current switch K4, and a second terminal of the sixth direct current switch S4 is connected to the first terminal of the switch circuit 60.

For the embodiments described in a and b, the sixth direct current switch is in a closed state.

The following describes a working principle when the sixth direct current switch is in an open state.

When the controller determines, based on the voltage information, that the voltage of the direct current charging pile 10 is greater than the voltage of the power battery pack 30, the controller controls K3 to be closed, controls S4 to be open, controls the movable terminal Z of K5 to be connected to the first non-movable terminal X, controls K4 to be closed, and controls the inverter circuit 40 and the switch circuit 60, as described in detail below.

Figure 14:
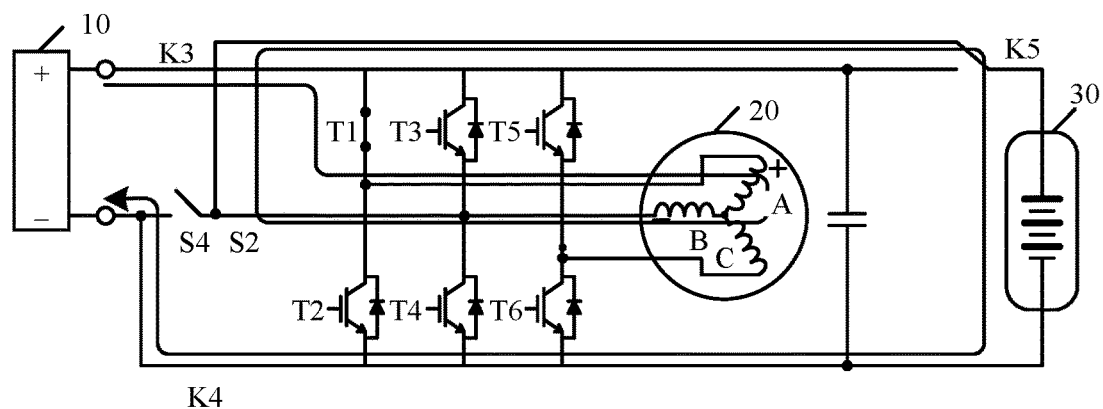
FIG. 14 is a schematic status diagram 1 of the motor control unit corresponding to FIG. 13.

The controller controls S2 and T1 to be turned on, and controls S1 and S3 to be open. For a status of the motor control unit in this case, refer to FIG. 14. A current sequentially passes through K3, T1, a phase-A winding of the motor, a phase-B winding of the motor, S2, K5, the power battery pack 30, and K4 to form a loop. In this case, the phase-A winding of the motor and the phase-B winding of the motor store energy, and the power battery pack 30 obtains a partial voltage provided by the direct current charging pile.

Figure 15:
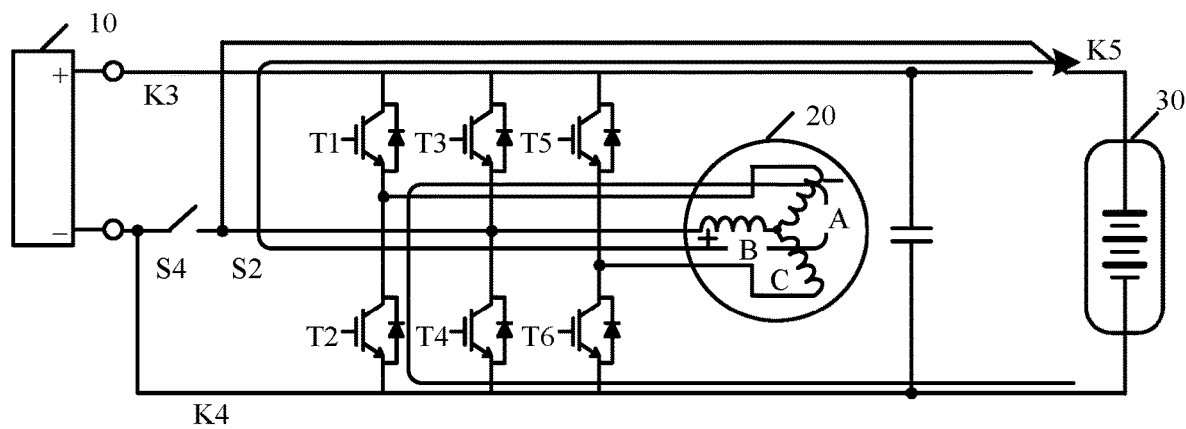
FIG. 15 is a schematic status diagram 2 of the motor control unit corresponding to FIG. 13.

The controller then controls T1 to be turned off. For the status of the motor control unit in this case, refer to FIG. 15. The phase-A winding of the motor and the phase-B winding of the motor discharge, and the current sequentially passes through S2, K5, the power battery pack 30, and an anti-parallel connected diode of T2 to form a loop. In some embodiments, the controller simultaneously controls K3 to be turned off.

A buck-boost circuit is formed above by reusing the bridge arm of the inverter circuit and the winding of the three-phase motor. In some embodiments, the controller can adjust a charging voltage of the power battery pack 30 by controlling a duty cycle of a control signal of T1.

The following describes a working principle when the power transmission interface is connected to a load. A load 10 may be a direct current power grid, or a power battery pack of another electric vehicle. This is not limited in this embodiment of this application.

Figure 16:
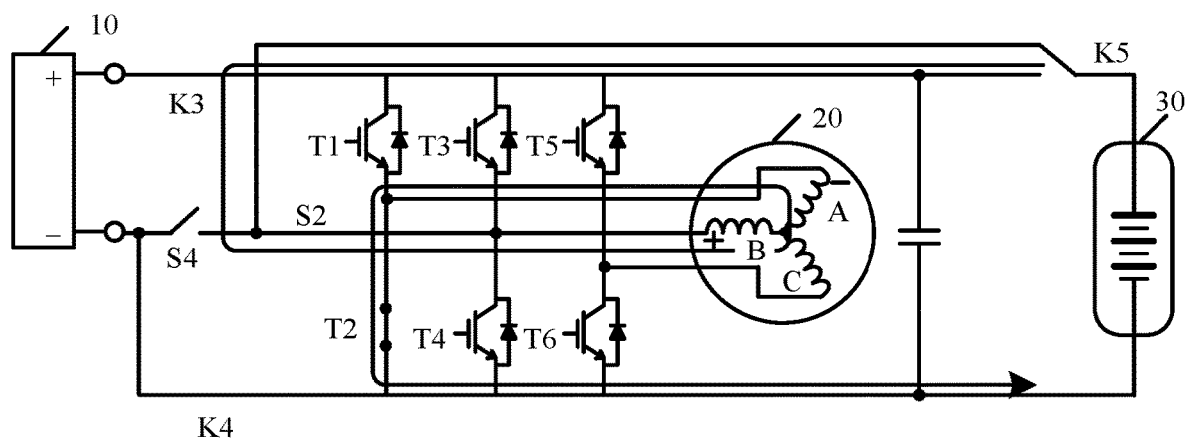
FIG. 16 is a schematic status diagram 3 of the motor control unit corresponding to FIG. 13.

The controller first controls T2 and S2 to be turned on, and controls S1, S3 and S4 to be open. For the status of the motor control unit in this case, refer to FIG. 16. A current sequentially passes through K5, S2, the phase-B winding of the motor, the phase-A winding of the motor, and T2 to form a loop. The phase-A winding of the motor and the phase-B winding of the motor store energy.

Figure 17:
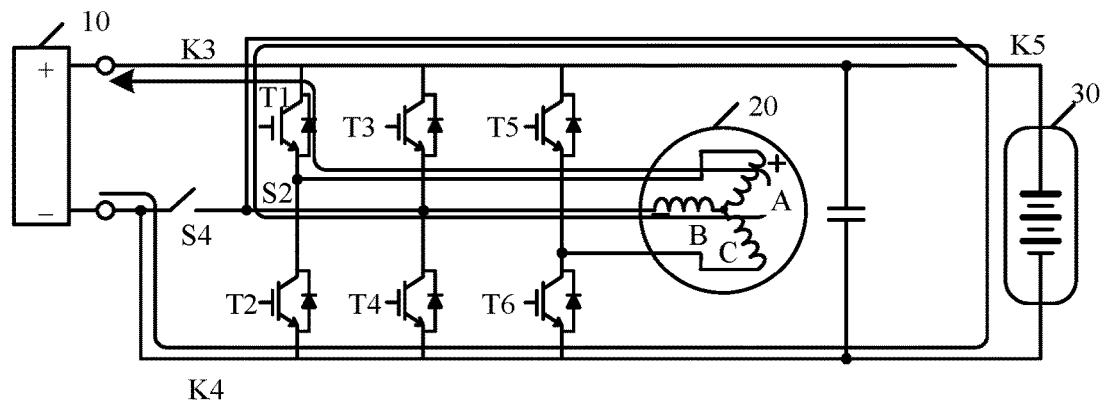
FIG. 17 is a schematic status diagram 4 of the motor control unit corresponding to FIG. 13.

The controller then controls T2 to be turned off. For the status of the motor control unit in this case, refer to FIG. 17. The current sequentially passes through K5, S2, the phase-B winding of the motor, the phase-A winding of the motor, an anti-parallel connected diode of T1, and the load 10 to form a loop. In this case, the phase-B winding of the motor, the phase-A winding of the motor, and the power battery pack 30 are connected in series to supply power to the load 10.

A boost circuit is formed above by reusing the bridge arm of the inverter circuit and the winding of the three-phase motor. In some embodiments, the controller can adjust a charging voltage of the load 10 by controlling a duty cycle of a control signal of T2.

It may be understood that reusing the motor winding A and the motor winding B of the three-phase motor is used as an example in the foregoing description. In actual application, the motor winding A and a motor winding C of the three-phase motor may alternatively be reused, or the motor winding B and the motor winding C of the three-phase motor may be reused.

To avoid reusing same two motor windings for a long time, control signals of T1 to T6 may be switched, to average reuse times of the three windings. This may prolong service lives of the windings and facilitate temperature control.

In some embodiments, a temperature of a motor winding may be detected by using a temperature sensor. The reused motor winding is switched when the temperature exceeds a preset temperature threshold. The preset temperature threshold is not limited in this embodiment of this application.

In some other embodiments, time lengths of the two reused motor windings are preset, and the reused motor windings are replaced based on the time lengths.

The following describes yet another embodiment of the motor control unit.

Figure 18:
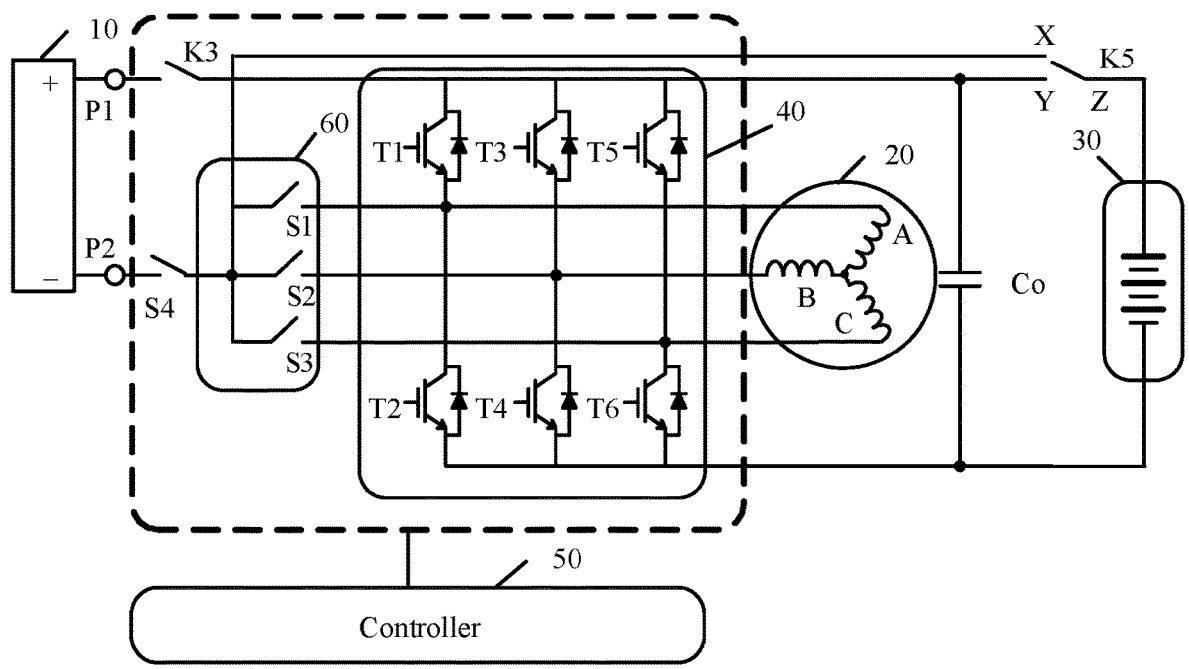
FIG. 18 is a schematic diagram of still another motor control unit according to an embodiment of this application.

FIG. 18 is a schematic diagram of still another motor control unit according to an embodiment of this application.

A difference between the illustrated motor control unit and the motor control unit shown in FIG. 2 lies in that the motor control unit further includes a fourth direct current switch K5 and a sixth direct current switch S4.

The fourth direct current switch K5 is a single-pole double-throw switch, a first non-movable terminal X of the fourth direct current switch K5 is connected to the first terminal of the switch circuit 60, a second non-movable terminal Y of the fourth direct current switch K5 is connected to the first input terminal of the inverter circuit 40, and a movable terminal Z of the fourth direct current switch K5 is connected to the power battery pack 30.

A first terminal of the sixth direct current switch S4 is connected to the second terminal P2 of the power transmission interface, and a second terminal of the sixth direct current switch is connected to the first terminal of the switch circuit 60.

The controller 50 is further configured to control the fourth direct current switch K5 and the sixth direct current switch S4, as described in detail below.

The motor control unit has the following working modes:

a. When the controller determines, based on the voltage information, that a voltage of a direct current charging pile 10 matches the voltage of the power battery pack 30, the controller controls K3 and S4 to be closed, and controls the movable terminal Z of K5 to be connected to the second non-movable terminal Y.

Figure 19:
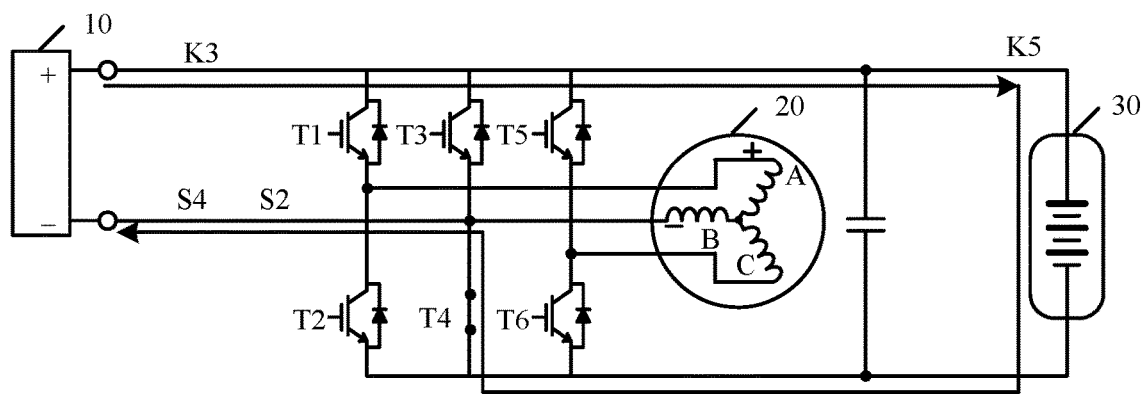
FIG. 19 is a schematic status diagram 1 of the motor control unit corresponding to FIG. 18.

The controller then controls T4 to be turned on, controls S2 to be closed, and controls S1 and S3 to be open. For a status of the motor control unit in this case, refer to FIG. 19. A current sequentially passes through K3, K5, the power battery pack 30, T4, S2, and S4 to form a closed loop. In this case, the direct current charging pile 10 and the power battery pack 30 may directly perform charging and discharging for each other.

The controller may alternatively control three groups of switches T4 and S2, T6 and S3, T2 and S1 to be turned on in turn, to average reuse times of the bridge arms of the inverter circuit. This may prolong a service life of the inverter circuit and facilitate temperature control.

In some embodiments, a temperature of the inverter circuit may be detected by using a temperature sensor. Switching is performed when the temperature exceeds a preset temperature threshold. The preset temperature threshold is not limited in this embodiment of this application.

In some other embodiments, a turn-on time length of each group of switches is preset, and switching is performed based on the time length.

b. When the controller determines that the voltage of the direct current charging pile 10 is less than the voltage of the power battery pack 30, the controller controls K3 to be closed, controls the movable terminal Z of K5 to be connected to the second non-movable terminal Y, and controls the inverter circuit 40 and the switch circuit 60. In this case, embodiments of the motor control unit shown in FIG. 18 and the motor control unit shown in FIG. 2 are the same.

In this case, for a particular principle in which the direct current charging pile 10 charges the power battery pack 30, refer to the descriptions corresponding to FIG. 4a and FIG. 5. In this case, two motor windings connected in series and a bridge arm of the inverter circuit form a boost circuit, and the direct current charging pile 10 charges the power battery pack 30 by using the boost circuit.

For a particular principle in which the power battery pack 30 charges the direct current charging pile 10, refer to the descriptions corresponding to FIG. 7 and FIG. 8. In this case, a bridge arm of the inverter circuit and two motor windings connected in series form a buck circuit, and the power battery pack 30 charges the direct current charging pile 10 by using the buck circuit.

c. When the controller determines that the power transmission interface is connected to the direct current charging pile 10, the controller controls K3 and S4 to be closed, controls the movable terminal Z of K5 to be connected to the first non-movable terminal X, and controls the inverter circuit 40 and the switch circuit 60, as described in detail below.

Figure 20:
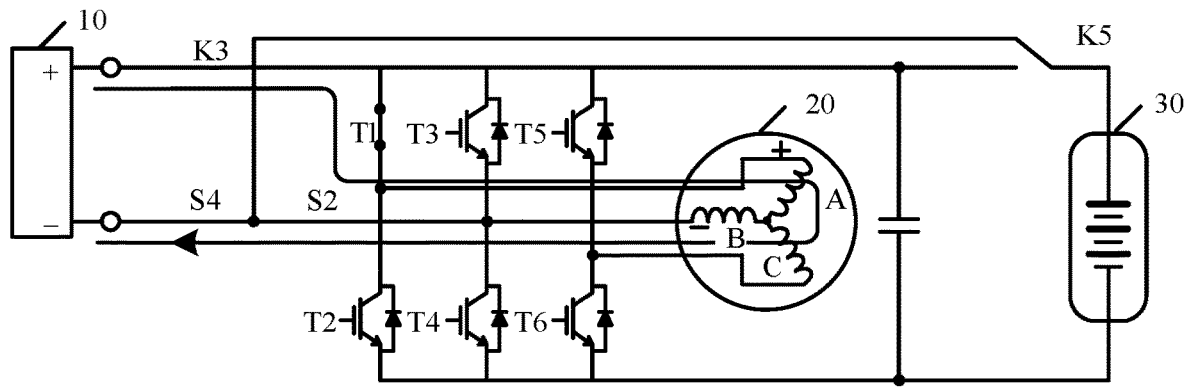
FIG. 20 is a schematic status diagram 2 of the motor control unit corresponding to FIG. 18.

The controller first controls T1 to be turned on, controls S2 to be closed, and controls S1 and S3 to be open. For the status of the motor control unit in this case, refer to FIG. 20. A current sequentially passes through K3, T1, the phase-A winding of the motor, the phase-B winding of the motor, S2, and S4 to form a loop. In this case, the phase-A winding of the motor and the phase-B winding of the motor store energy.

Figure 21:
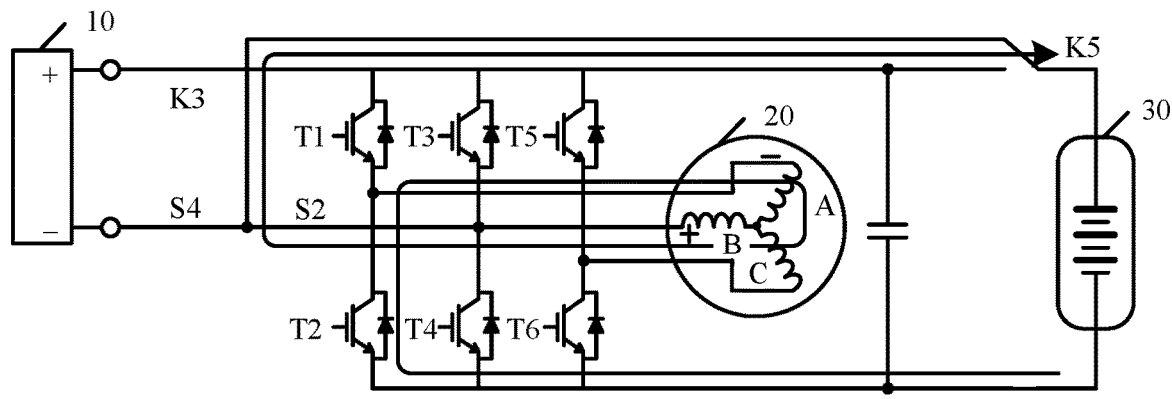
FIG. 21 is a schematic status diagram 3 of the motor control unit corresponding to FIG. 18.

The controller then controls T1 to be turned off. For the status of the motor control unit in this case, refer to FIG. 21. The phase-A winding of the motor and the phase-B winding of the motor discharge, and the current sequentially passes through S2, K5, the power battery pack 30, and an anti-parallel connected diode of T2 to form a closed loop, to charge the power battery pack 30. In this case, the controller further controls the first direct current switch K3 to be open.

A buck-boost circuit is formed above by reusing the bridge arm of the inverter circuit and the winding of the three-phase motor. In some embodiments, the controller can adjust a charging voltage of the power battery pack 30 by controlling a duty cycle of a control signal of T1.

The following describes a working principle when the power transmission interface is connected to a load. A load 10 may be a direct current power grid, or a power battery pack of another electric vehicle. This is not limited in this embodiment of this application.

When the controller determines that the power transmission interface is connected to the load, the controller controls K3 to be closed, controls the movable terminal Z of K5 to be connected to the first non-movable terminal X, and controls the inverter circuit 40 and the switch circuit 60, as described in detail below.

Figure 22:
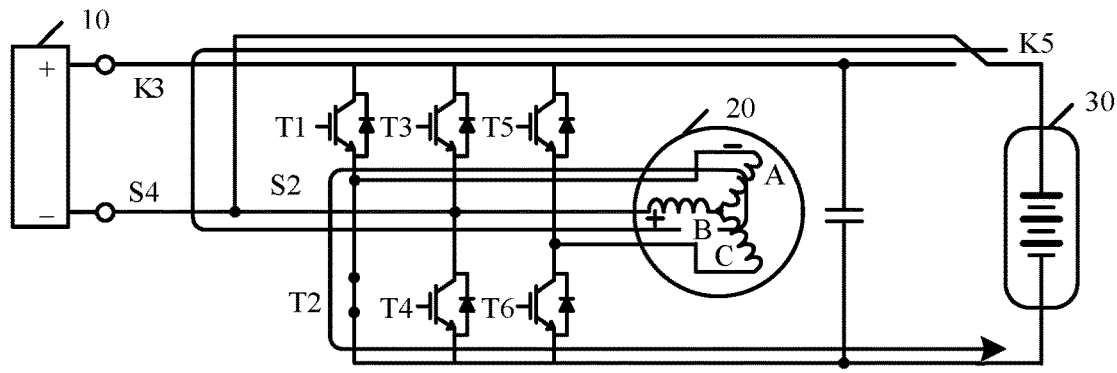
FIG. 22 is a schematic status diagram 4 of the motor control unit corresponding to FIG. 18.

The controller first controls T2 and S2 to be turned on, and controls S1 and S3 to be open. For the status of the motor control unit in this case, refer to FIG. 22. A current sequentially passes through K5, S2, the phase-B winding of the motor, the phase-A winding of the motor, and T2 to form a loop. In this case, the phase-A winding of the motor and the phase-B winding of the motor store energy.

Figure 23:
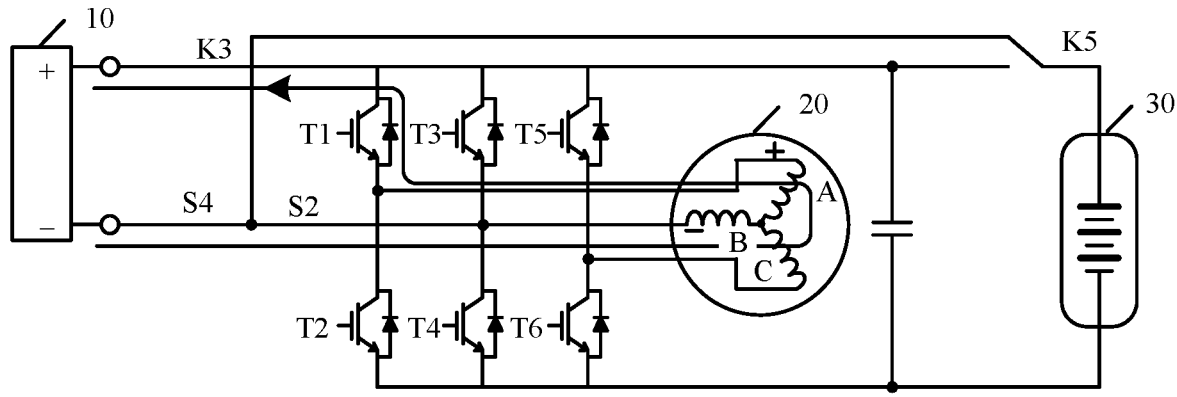
FIG. 23 is a schematic status diagram 5 of the motor control unit corresponding to FIG. 18.

The controller then controls T2 to be turned off. For the status of the motor control unit in this case, refer to FIG. 23. The phase-A winding of the motor and the phase-B winding of the motor discharge, and in this case, the current sequentially passes through an anti-parallel connected diode of T1, the load 10, and S2 to form a loop.

A buck-boost circuit is formed above by reusing the bridge arm of the inverter circuit and the winding of the three-phase motor. In some embodiments, the controller can adjust a charging voltage of the load 10 by controlling a duty cycle of a control signal of T2, to implement boost charging or buck charging for the load 10.

It may be understood that, in the foregoing description, an example in which the controller controls S2 to be closed and controls S1 and S3 to be open is used for description. In this case, the motor winding A and the motor winding B of the three-phase motor are reused. In actual application, the controller may alternatively control S1 to be closed and control S2 and S3 to be open, to reuse the motor winding A and a motor winding C of the three-phase motor; or may control S3 to be closed to reuse the motor winding B and the motor winding C of the three-phase motor.

In actual application, to avoid reusing same two motor windings for a long time, S1, S2, and S3 may be closed in turn, to average reuse times of the three windings. This may prolong service lives of the windings and facilitate temperature control.

In some embodiments, a temperature of a motor winding may be detected by using a temperature sensor. When the temperature exceeds a preset temperature threshold, the controller switches a closed controllable switch, to replace the reused motor winding. The preset temperature threshold is not limited in this embodiment of this application.

In some other embodiments, a closing time length of each controllable switch in the switch circuit is preset, and the reused motor winding is switched based on the time length.

In conclusion, in the solution provided in this embodiment of this application, the inverter circuit of the motor control unit and the winding of the three-phase motor are reused to implement functions of the boost circuit, the buck circuit, and the buck-boost circuit without requiring an inductor, thereby reducing a volume and hardware costs that are required by the motor control unit. The solution is applicable to a plurality of scenarios, thereby extending application scenarios and improving applicability, and the volume and the costs do not greatly increase.

Figure 24A:
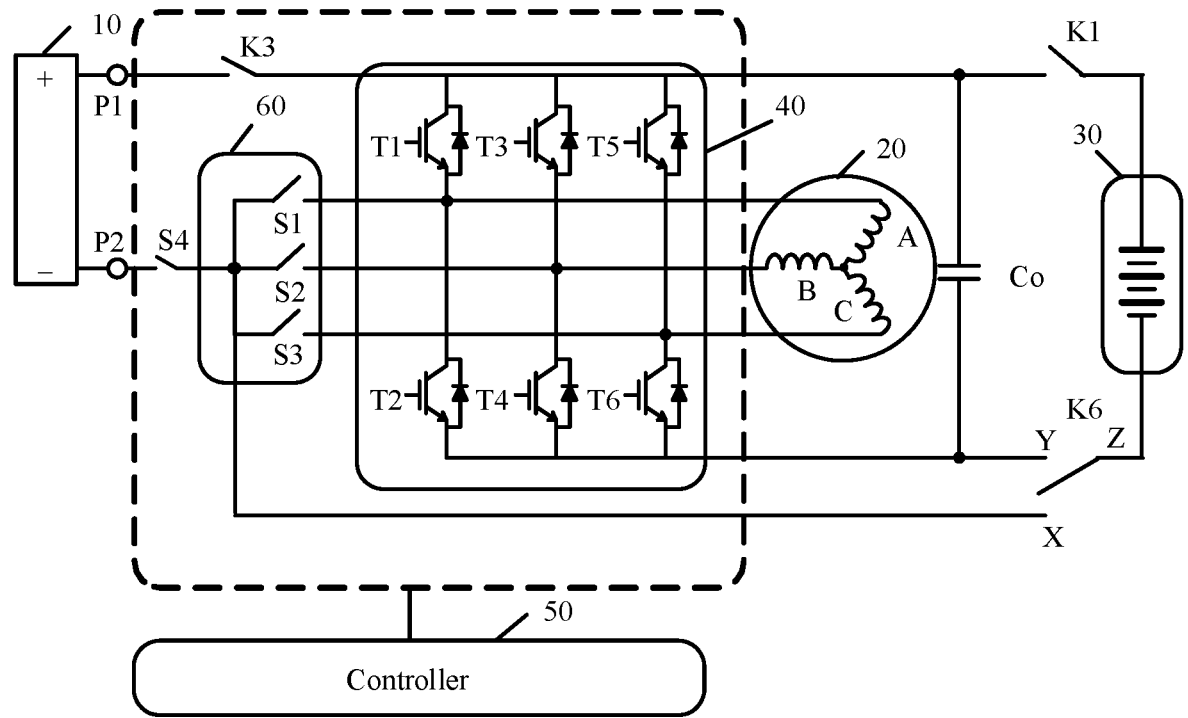
FIG. 24a is a schematic diagram of yet another motor control unit according to an embodiment of this application.

FIG. 24a is a schematic diagram of yet another motor control unit according to an embodiment of this application.

A difference between the illustrated motor control unit and the motor control unit shown in FIG. 3 lies in that the motor control unit further includes a fifth direct current switch K6 and a sixth direct current switch S4.

The fifth direct current switch K6 is a single-pole double-throw switch, a first non-movable terminal X of the fifth direct current switch K6 is connected to the first terminal of the switch circuit 60, a second non-movable terminal Y of the fifth direct current switch K6 is connected to a second input terminal of the inverter circuit 40, and a movable terminal Z of the fifth direct current switch is connected to a negative electrode of the power battery pack 30.

A first terminal of the sixth direct current switch S4 is connected to the second terminal P2 of the power transmission interface, and a second terminal of the sixth direct current switch S4 is connected to the first terminal of the switch circuit 60.

When the movable terminal Z of K6 is connected to the second non-movable terminal Y, there are the following modes:

① When the controller determines that a voltage provided by a direct current charging pile matches the voltage of the power battery pack, the controller controls S4, K3, and K1 to be closed, and controls S1, S2, and S3 to be turned on in turn. In this case, the direct current charging pile directly charges the power battery pack.

② When the controller determines that the voltage provided by the power battery pack matches a voltage required by a load connected to the power transmission interface, the controller controls K1, K3 and S4 to be turned on, and controls three groups of switches S1 and T2, S2 and T4, and S3 and T6 to be turned on in turn, so that the power battery pack directly supplies power to the load.

③ When the controller determines that voltages on two sides (that is, 10 and the power battery pack 30) of the power transmission interface do not match, for a particular working principle of the motor control unit, refer to the related description corresponding to FIG. 3, and a difference lies in that the controller further correspondingly controls S4 based on a required current loop. Details are not described herein in this embodiment.

When the movable terminal Z of K6 is connected to the first non-movable terminal X, the working principle of the motor control unit may be similar to the working principle of the motor control unit shown in FIG. 18. A difference lies in that a position of the single-pole double-throw switch is changed, so that the first terminal of the switch circuit may be connected to a positive electrode or the negative electrode of the power battery pack by using the non-movable terminal X of the single-pole double-throw switch.

Similarly, during charging and discharging, the reused motor winding is not limited to the motor winding A and the motor winding B, and the reuse times of the motor windings may be further averaged.

In conclusion, in the solution provided in this embodiment of this application, the inverter circuit of the motor control unit and the winding of the three-phase motor are reused to implement a function of the boost circuit, the buck circuit, or a buck-boost circuit without requiring an inductor. This reduces a volume and hardware costs that are required by the motor control unit. The solution is applicable to a plurality of scenarios, thereby extending application scenarios and improving applicability, and the volume and the costs do not greatly increase.

Figure 24B:
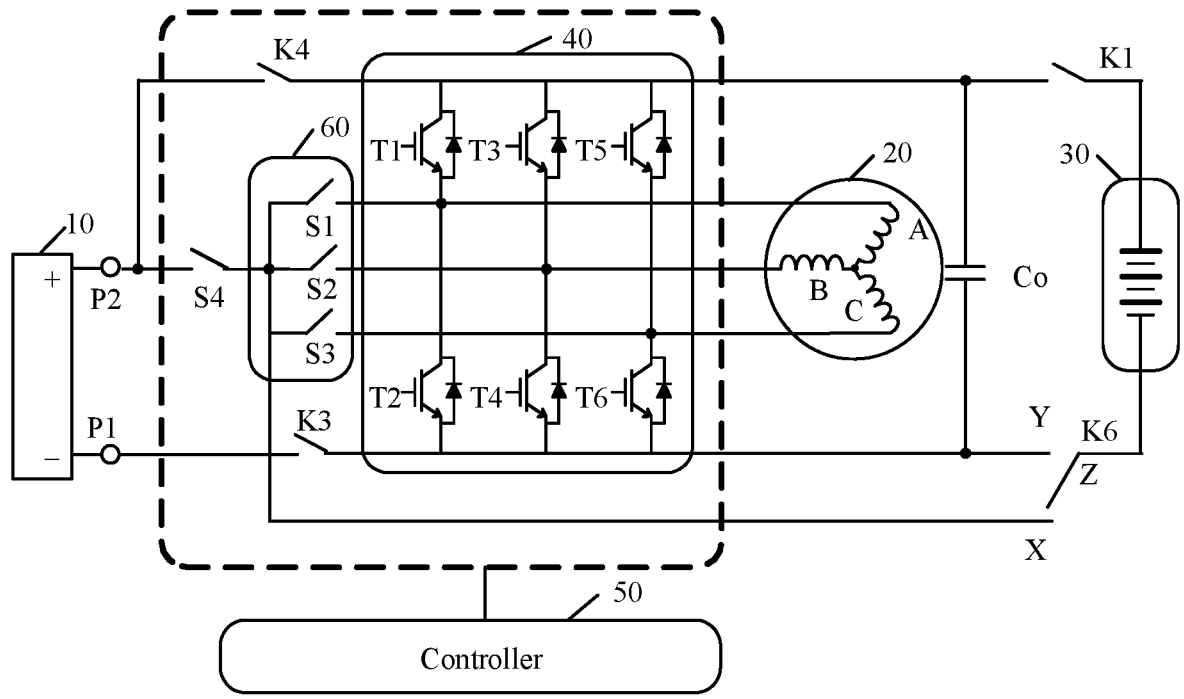
FIG. 24b is a schematic diagram of another motor control unit according to an embodiment of this application.

FIG. 24b is a schematic diagram of another motor control unit according to an embodiment of this application.

The illustrated motor control unit and the motor control unit shown in FIG. 13 use a symmetrical structure. That is, the first terminal P1 of the power transmission interface is connected to the negative electrode of the power battery pack 30 by using K3, the second non-movable terminal Y, and the movable terminal Z; and the second terminal P2 of the power transmission interface is connected to the positive electrode of the power battery pack 30 by using K4 and K1. The second terminal P2 of the power transmission interface is connected to the first terminal of the switch circuit 60 by using the sixth direct current switch.

A working principle of the motor control unit is similar to the description of the motor control unit shown in FIG. 13, and details are not described herein in this embodiment of this application.

In some other embodiments, K4 may alternatively be canceled for the motor control unit shown in FIG. 24b. In this case, the working principle of the motor control unit is similar to the principle of the motor control unit shown in FIG. 18, and details are not described herein in this embodiment.

In the foregoing embodiments, an example in which the switch circuit includes three controllable switches is used for description. The following provides a description by using an example in which the switch circuit includes only one controllable switch.

Figure 25A:
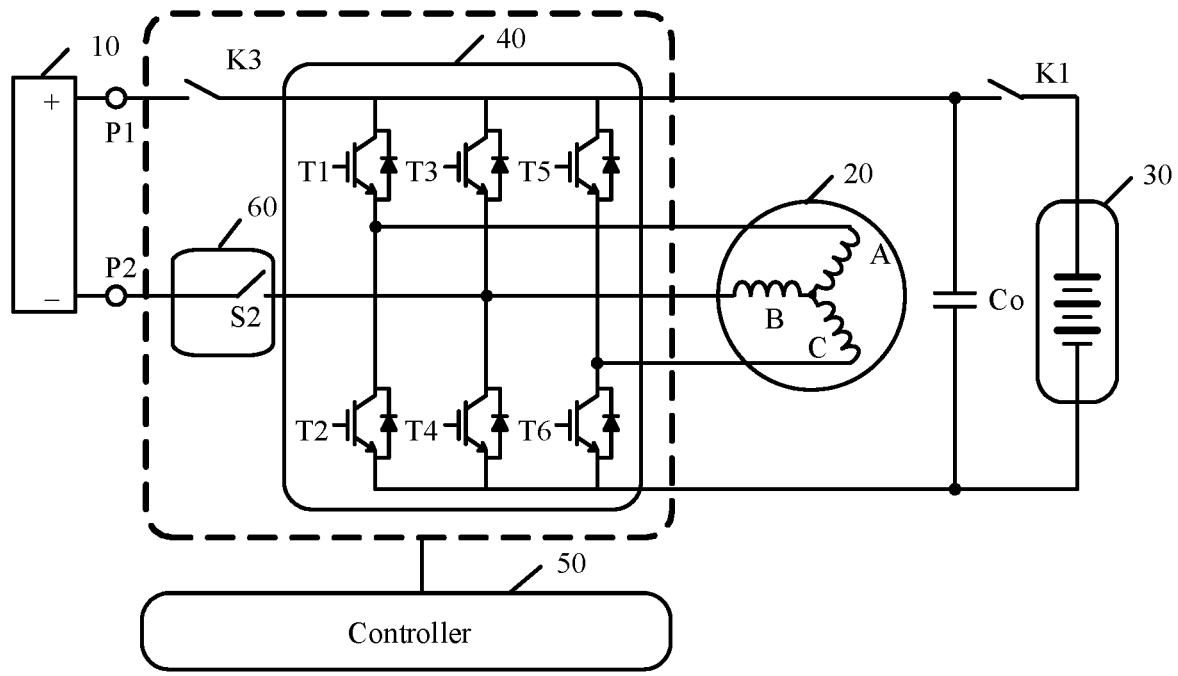
FIG. 25a is a schematic diagram of still another motor control unit according to an embodiment of this application.

FIG. 25a is a schematic diagram of still another motor control unit according to an embodiment of this application.

An input of the motor control unit is connected to a power battery pack 30 of an electric vehicle, and an output of the motor control unit is connected to a three-phase motor 20. The motor control unit includes an inverter circuit 40, a power transmission interface (P1 and P2), a controller 50, a first direct current switch K3, a second direct current switch K1, and a switch circuit 60.

A difference between the switch circuit shown in FIG. 25a and the switch circuit shown in FIG. 2 lies in that the switch circuit includes only one controllable switch S2. One terminal of the controllable switch S2 is connected to the second terminal P2 of the power transmission interface, and the other terminal of the controllable switch S2 is connected to a midpoint of a bridge arm. In the figure, a connection to a midpoint of a bridge arm on which controllable switching transistors T3 and T4 are located is used as an example. A principle is similar when the other terminal of the controllable switch S2 is connected to a midpoint of either of the other two bridge arms. Details are not described herein in this embodiment of this application.

The following describes a working principle of the motor control unit.

A working principle when the power transmission interface is connected to a direct current power supply is first described. A description is provided by using an example in which a positive output terminal of a direct current power supply 10 is connected to P1 and a negative output terminal of the direct current power supply 10 is connected to P2.

When the controller controls K1, S2, and K3 to be closed, the controller first controls T1 to be turned on. In this case, a current sequentially passes through K3, T1, a motor winding A, a motor winding B, and S2 to form a closed loop, and the direct current power supply supplies energy to the motor winding A and the motor winding B for storage.

The controller then controls T1 to be turned off. In this case, the current passes through the motor winding A, the motor winding B, S2, the direct current power supply 10, K3, K1, the power battery pack 30, and an anti-parallel connected diode of T2 to form a closed loop. In this case, the motor winding A, the motor winding B, and the direct current power supply 10 are connected in series to charge the power battery pack 30.

The bridge arm of the inverter circuit and the winding of the three-phase motor are reused to form a boost circuit. When a voltage provided by the direct current power supply 10 is less than a voltage of the power battery pack 30, the direct current power supply 10 can still continue to charge the power battery pack 30 by using the boost circuit.

In some embodiments, the controller can adjust a charging voltage of the power battery pack 30 by controlling a duty cycle of a control signal of T1.

In the foregoing description, for example, K1 is kept normally closed, and no high-frequency on-off action is performed, so that control efficiency can be improved.

In some other embodiments, alternatively, when the motor winding A and the motor winding B store energy, K1 may be controlled to be turned off and when the motor winding A and the motor winding B discharge, K1 may be controlled to be closed.

When the controller determines that the voltage provided by the power supply 10 is greater than the voltage of the power battery pack 30, after controlling S2 and K3 to be closed and controlling K1 to be open, the controller first controls T1 to be turned on. In this case, a current sequentially passes through K3, T1, the motor winding A, the motor winding B, and S2 to form a closed loop, and the direct current power supply supplies energy to the motor winding A and the motor winding B for storage.

After energy storage of the motor winding A and the motor winding B is completed, the controller controls K3 to be open and controls K1 and K2 to be closed. In this case, the current passes through the motor winding A, the motor winding B, an anti-parallel connected diode of T3, K1, the power battery pack 30, and the anti-parallel connected diode of T2 to form a closed loop. Buck charging of the power battery pack 30 can be implemented.

The controller can adjust the charging voltage of the power battery pack 30 by adjusting the duty cycle of the control signal of T1.

The following describes a working principle when the power transmission interface is connected to a load. A load 10 may be a direct current power grid, or a power battery pack of another electric vehicle. This is not limited in this embodiment of this application.

After controlling K1, K3, and S2 to be closed, the controller first controls T2 to be turned on. In this case, the power battery pack 30 discharges. A closed loop is formed after a current sequentially passes through K1, K3, the load 10, S2, a phase-B winding of the motor, a phase-A winding of the motor, and T2. The power battery pack 30 not only supplies power to the load 10, but also supplies energy to the phase-B winding of the motor and the phase-A winding of the motor for storage. The load 10 divides the voltage to obtain a partial voltage of the power battery pack 30.

The controller then controls T2 to be turned off. In this case, the current passes through an anti-parallel connected diode of T1, K3, the load, and S2 to form a closed loop. The phase-B winding of the motor and the phase-A winding of the motor are connected in series to supply power to the load.

In the foregoing description, for example, K1 is kept normally closed, and no high-frequency on-off action is performed, so that a control signal can be simplified and control efficiency can be improved.

In this case, the bridge arm of the inverter circuit and the winding of the three-phase motor are reused to form a buck circuit. When a voltage required by the load 10 is less than the voltage of the power battery pack 30, the power battery pack 30 can still continue to supply power to the load 10 by using the buck circuit.

In some embodiments, the controller can adjust, by controlling a duty cycle of a control signal of T2, a voltage that is output to the load 10.

In some other embodiments, when the voltage required by the load 10 is greater than the voltage of the power battery pack 30, the controller controls K3 to be open, controls K1 to be closed, and controls S2 to be closed. Then, the controller first controls T2 and T3 to be turned on. In this case, the power battery pack 30 supplies energy to the phase-B winding of the motor and the phase-A winding of the motor for storage, and a current sequentially passes through K1, T3, the phase-B winding of the motor, the phase-A winding of the motor, and T2 to form a closed loop.

The controller then controls T3 and K1 to be turned off, maintains T2 to be turned on, and controls K3 to be closed. In this case, the current sequentially passes through the anti-parallel connected diode of T1, K3, the load 10, S2, the phase-B winding of the motor, and the phase-A winding of the motor to form a closed loop. The motor winding A, the motor winding B, and the power battery pack 30 are connected in series to charge the load 10.

The bridge arm of the inverter circuit and the winding of the three-phase motor are reused to form a boost circuit. When the voltage required by the load 10 is greater than the voltage of the power battery pack 30, the power battery pack 30 can still supply power to the load 10 by using the boost circuit.

In some embodiments, the controller can adjust, by controlling duty cycles of control signals of T2 and T3, the voltage that is output to the load 10.

A voltage Vb of the power battery pack 30 is a known configuration parameter. A VCU of the electric vehicle obtains a voltage Vn of the power supply connected to the power transmission interface or a voltage Vn corresponding to the load. The VCU compares a value of Vn with a value of Vb to obtain voltage information, and transmits the voltage information to the controller, so that the controller controls a third direct current switch, a fourth direct current switch, the controllable switch, and the inverter circuit based on the voltage information.

In some embodiments, when the power transmission interface is connected to a direct current charging pile, the VCU may receive a voltage parameter sent by the direct current charging pile. In this case, the voltage parameter represents a direct current voltage that is output for direct current charging, or an input voltage of the direct current charging pile.

When the power transmission interface is connected to another electric vehicle, the VCU may receive a voltage parameter sent by the another electric vehicle. In this case, the voltage parameter represents a voltage that is output by a power battery pack of the another electric vehicle, or a charging voltage of the power battery pack of the another electric vehicle. The VCU determines Vn based on the obtained voltage parameter.

The VCU compares the value of Vn with the value of Vb to obtain the voltage information, and transmits the voltage information to the controller, so that the controller controls the controllable switch and the inverter circuit based on the voltage information.

Figure 25B:
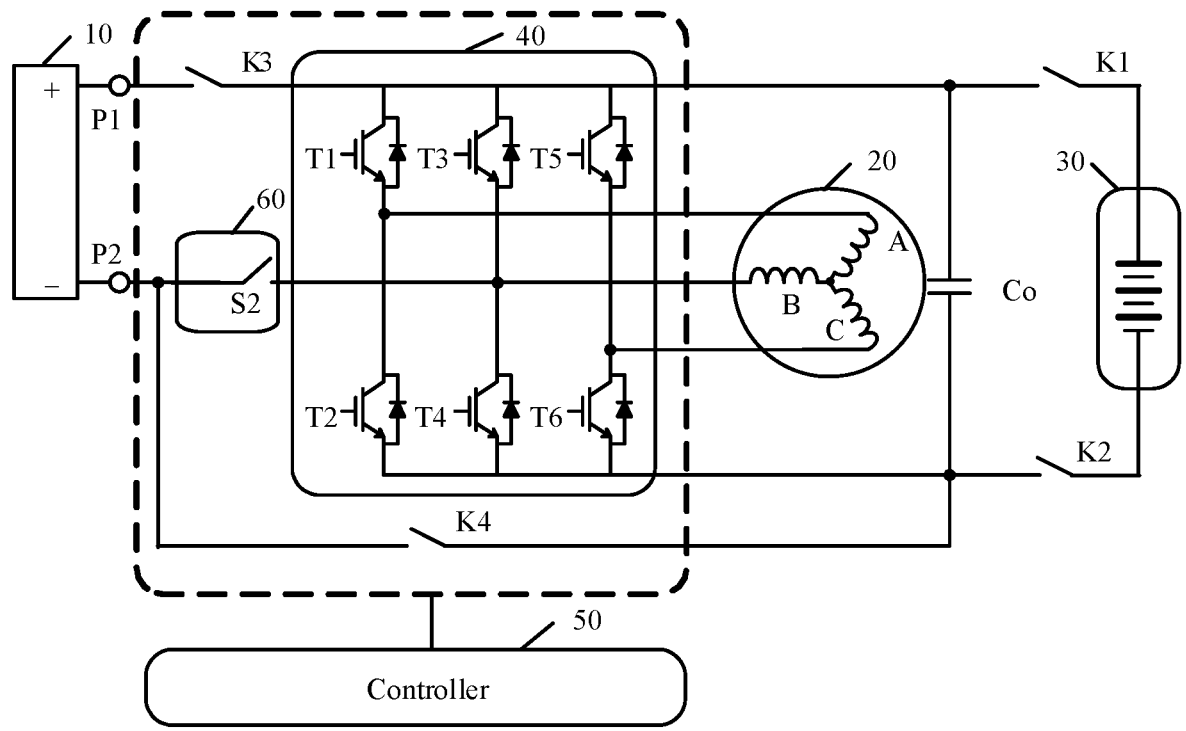
FIG. 25b is a schematic diagram of yet another motor control unit according to an embodiment of this application.

FIG. 25b is a schematic diagram of yet another motor control unit according to an embodiment of this application.

A difference between the motor control unit shown in FIG. 25b and the motor control unit shown in FIG. 11 lies in that the switch circuit 60 includes only one controllable switch S2. One terminal of the controllable switch S2 is connected to the second terminal P2 of the power transmission interface, and the other terminal of the controllable switch S2 is connected to a midpoint of a bridge arm. In the figure, a connection to a midpoint of a bridge arm on which controllable switching transistors T3 and T4 are located is used as an example. A principle is similar when the other terminal of the controllable switch S2 is connected to a midpoint of either of the other two bridge arms.

A working principle of the motor control unit shown in FIG. 25b is similar to the working principle of the motor control unit shown in FIG. 11, and details are not described herein in this embodiment of this application.

In some other embodiments, a first capacitor C1 may be further disposed between the first terminal P1 and the second terminal P2 of the power transmission interface, and the first capacitor C1 is used for filtering, so that better matching can be performed between the two sides.

Figure 25C:
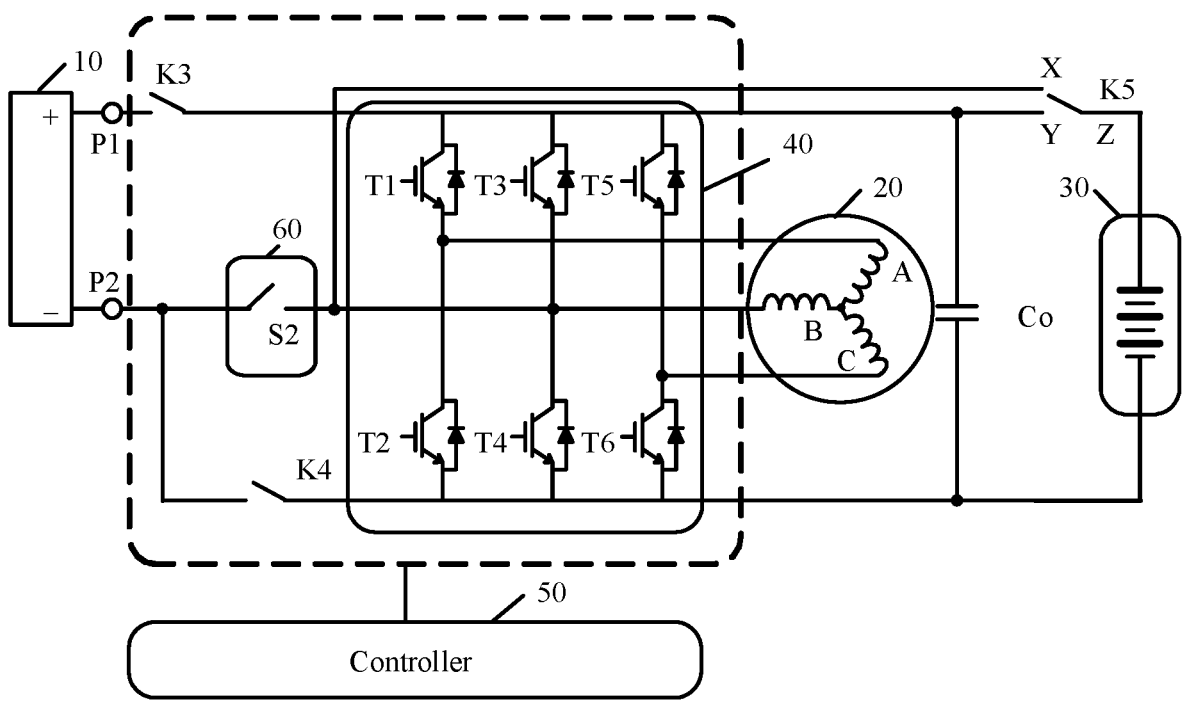
FIG. 25c is a schematic diagram of another motor control unit according to an embodiment of this application.

FIG. 25c is a schematic diagram of another motor control unit according to an embodiment of this application.

A difference between the motor control unit shown in FIG. 25c and the motor control unit shown in FIG. 13 lies in that the switch circuit 60 includes only one controllable switch S2. One terminal of the controllable switch S2 is connected to the second terminal P2 of the power transmission interface, and the other terminal of the controllable switch S2 is connected to a midpoint of a bridge arm. In the figure, a connection to a midpoint of a bridge arm on which controllable switching transistors T3 and T4 are located is used as an example. A principle is similar when the other terminal of the controllable switch S2 is connected to a midpoint of either of the other two bridge arms.

A working principle of the motor control unit shown in FIG. 25c is similar to the working principle of the motor control unit shown in FIG. 13, and details are not described herein in this embodiment of this application.

Further, refer to the motor control unit shown in FIG. 18. When the motor control unit shown in FIG. 25c is used, functions of the motor control unit shown in FIG. 18 may be implemented, and disposing of the sixth direct current switch S4 may be avoided, thereby reducing hardware costs.

Figure 25D:
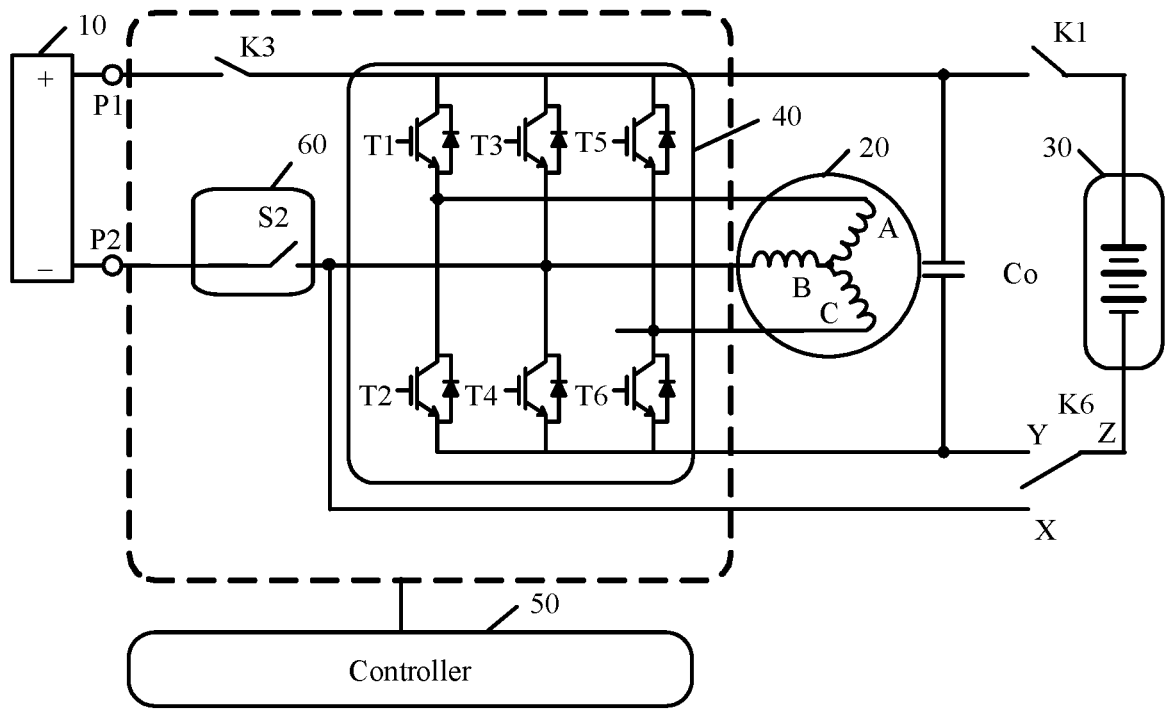
FIG. 25d is a schematic diagram of still another motor control unit according to an embodiment of this application.

FIG. 25d is a schematic diagram of still another motor control unit according to an embodiment of this application.

A difference between the motor control unit shown in FIG. 25d and the motor control unit shown in FIG. 24a lies in that the switch circuit 60 includes only one controllable switch S2. One terminal of the controllable switch S2 is connected to the second terminal P2 of the power transmission interface, and the other terminal of the controllable switch S2 is connected to a midpoint of a bridge arm. In the figure, a connection to a midpoint of a bridge arm on which controllable switching transistors T3 and T4 are located is used as an example. A principle is similar when the other terminal of the controllable switch S2 is connected to a midpoint of either of the other two bridge arms. In addition, disposing of the sixth direct current switch S4 may be avoided, thereby reducing hardware costs.

A working principle of the motor control unit shown in FIG. 25d is similar to the working principle of the motor control unit shown in FIG. 24a, and details are not described herein in this embodiment of this application.

Figure 25E:
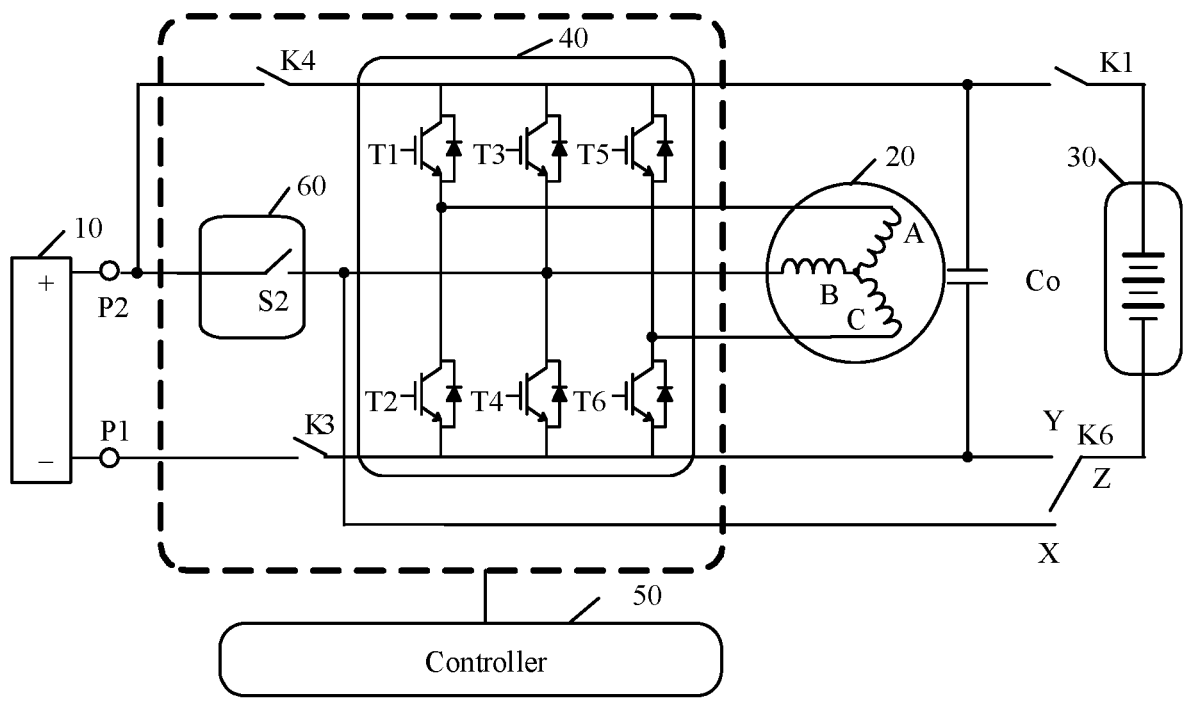
FIG. 25e is a schematic diagram of yet another motor control unit according to an embodiment of this application.

FIG. 25e is a schematic diagram of yet another motor control unit according to an embodiment of this application.

A difference between the motor control unit shown in FIG. 25e and the motor control unit shown in FIG. 24b lies in that the switch circuit 60 includes only one controllable switch S2. One terminal of the controllable switch S2 is connected to the second terminal P2 of the power transmission interface, and the other terminal of the controllable switch S2 is connected to a midpoint of a bridge arm. In the figure, a connection to a midpoint of a bridge arm on which controllable switching transistors T3 and T4 are located is used as an example. A principle is similar when the other terminal of the controllable switch S2 is connected to a midpoint of either of the other two bridge arms. In addition, disposing of the sixth direct current switch S4 may be avoided, thereby reducing hardware costs.

A working principle of the motor control unit shown in FIG. 25e is similar to the working principle of the motor control unit shown in FIG. 24b, and details are not described herein in this embodiment of this application.

It should be noted that the first non-movable terminal X of the single-pole double-throw switch in FIG. 25c to FIG. 25e above is connected to a second terminal of the controllable switch S2.

In conclusion, in the solution provided in this embodiment of this application, the inverter circuit of the motor control unit and the winding of the three-phase motor are reused to implement functions of the boost circuit and the buck circuit without requiring an inductor. This reduces a volume and hardware costs that are required by the motor control unit.

In addition, the solution is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, the solution can be applied in more application scenarios, thereby improving applicability, and the volume and the costs do not greatly increase.

In addition, in another embodiment, two of S1, S2, and S3 may be selected to be retained, and the two controllable switches are alternately turned on. In this case, a embodiment of the motor control unit is similar to the description in the foregoing embodiments, and details are not described herein in this embodiment of this application.

The inverter circuit in this embodiment of this application is a three-phase two-level inverter circuit or a three-phase three-level inverter circuit.

The three-phase two-level inverter circuit is used as an example for the inverter circuit in the foregoing embodiments of this application. The following describes another embodiment of the inverter circuit.

The inverter circuit in the embodiments of this application may alternatively be a three-level inverter circuit.

In some embodiments, the three-level inverter circuit is a neutral point clamped (NPC) three-level inverter circuit.

Figure 26:
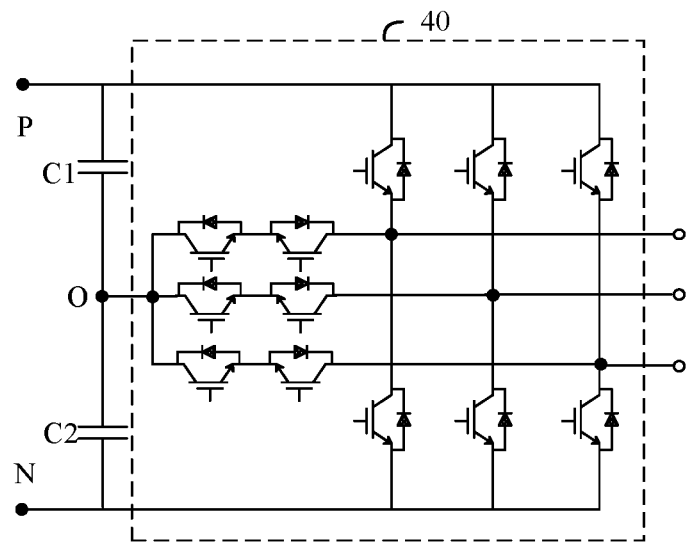
FIG. 26 is a schematic diagram of a schematic three-level inverter circuit according to an embodiment of this application.
Figure 27:
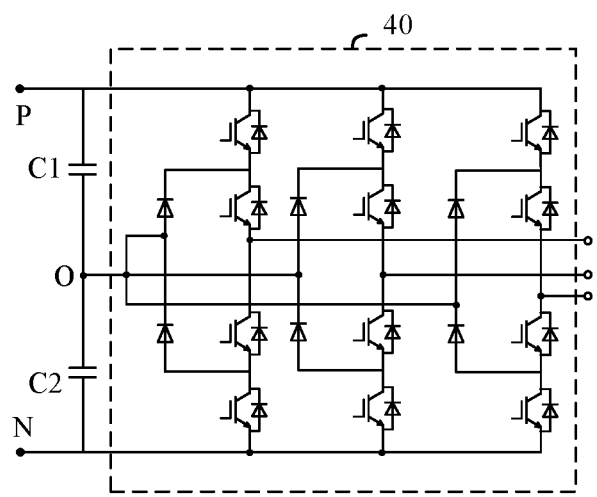
FIG. 27 is a schematic diagram of another schematic three-level inverter circuit according to an embodiment of this application.

FIG. 26 and FIG. 27 show schematic diagrams of neutral point clamped three-level inverter circuits.

FIG. 26 shows a schematic diagram of a three-level inverter circuit using a "T"-type connection. FIG. 27 shows a schematic diagram of a three-level inverter circuit using an "I"-type connection.

Figure 28:
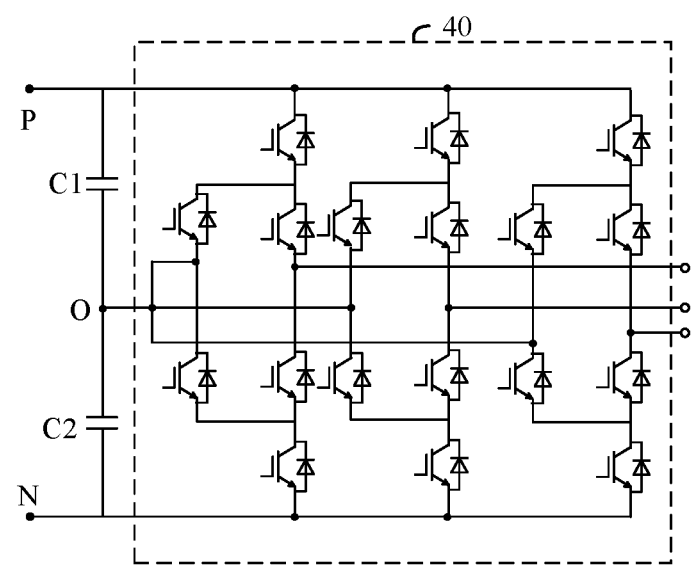
FIG. 28 is a schematic diagram of still another schematic three-level inverter circuit according to an embodiment of this application.

In some other embodiments, the three-level inverter circuit may alternatively be an active neutral point clamped (ANPC) three-level inverter circuit. For a schematic diagram of the circuit, refer to FIG. 28.

A principle of reusing an inverter bridge arm of the three-level inverter circuit is similar to the principle in the foregoing embodiments, and details are not described herein in this embodiment of this application.

Based on the motor control unit provided in the foregoing embodiments, an embodiment of this application further provides an electric drive system. The following provides a description with reference to the accompanying drawings.

Figure 29:
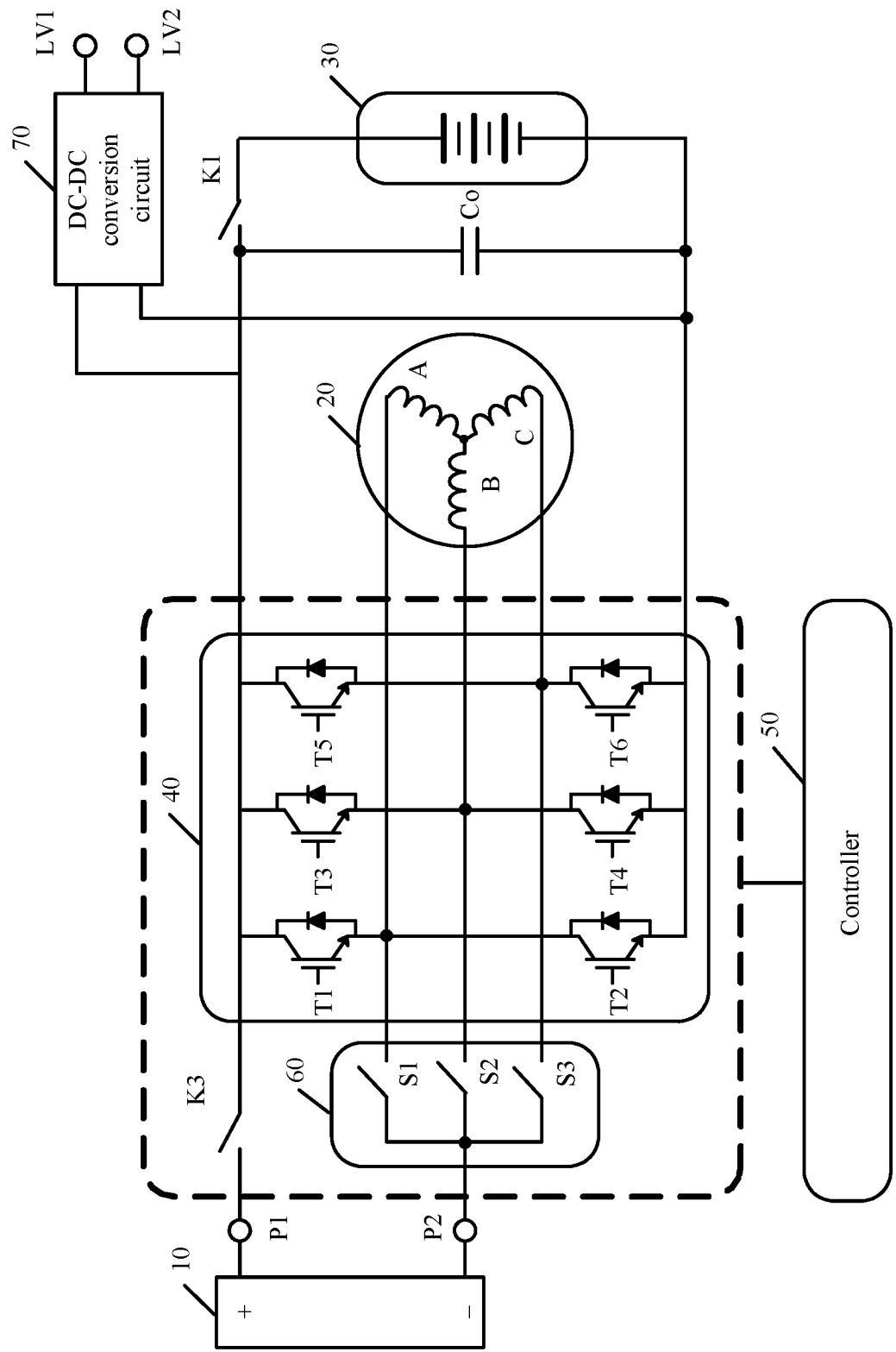
FIG. 29 is a schematic diagram of an electric drive system according to an embodiment of this application.

FIG. 29 is a schematic diagram of an electric drive system according to an embodiment of this application.

The electric drive system includes the motor control unit provided in the foregoing embodiments, and further includes a direct current (DC)-direct current conversion circuit.

A first input terminal of the illustrated DC-DC conversion circuit 70 is connected to the first input terminal of the inverter circuit 40, a second input terminal of the DC-DC conversion circuit 70 is connected to the second input terminal of the inverter circuit 40, and an output terminal (denoted by LV1 and LV2 in the figure) of the DC-DC conversion circuit 70 is connected to a low-voltage battery of an electric vehicle or to a low-voltage system of an electric vehicle in which the DC-DC conversion circuit 70 is located.

For a embodiment of the motor control unit, refer to the related description in the foregoing embodiments, and details are not described herein in this embodiment of this application.

The DC-DC conversion circuit 70 is configured to perform direct current conversion on a high-voltage direct current provided by a power battery pack, to charge the low-voltage battery.

In some embodiments, the controller 50 is further configured to control a working status of the DC-DC conversion circuit 70. That is, the DC-DC conversion circuit 70 is integrated with the controller of the motor control unit.

In conclusion, in the electric drive system provided in this embodiment of this application, the inverter circuit of the motor control unit and the winding of the three-phase motor can be reused through reusing. The controller controls the first direct current switch, the second direct current switch, the controllable switch, and the controllable switching transistor in the inverter circuit, to implement functions of the boost circuit and the buck circuit without requiring an inductor. This reduces a volume and hardware costs that are required by the motor control unit.

In addition, the electric drive system is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended, and applicability is improved.

In some other embodiments, the electric drive system may alternatively include the motor control unit shown in FIG. 25a to FIG. 25e. Details are not described herein in this embodiment of this application.

Based on the electric drive system provided in the foregoing embodiment, an embodiment of this application further provides a powertrain. The following provides a description with reference to the accompanying drawings.

Figure 30:
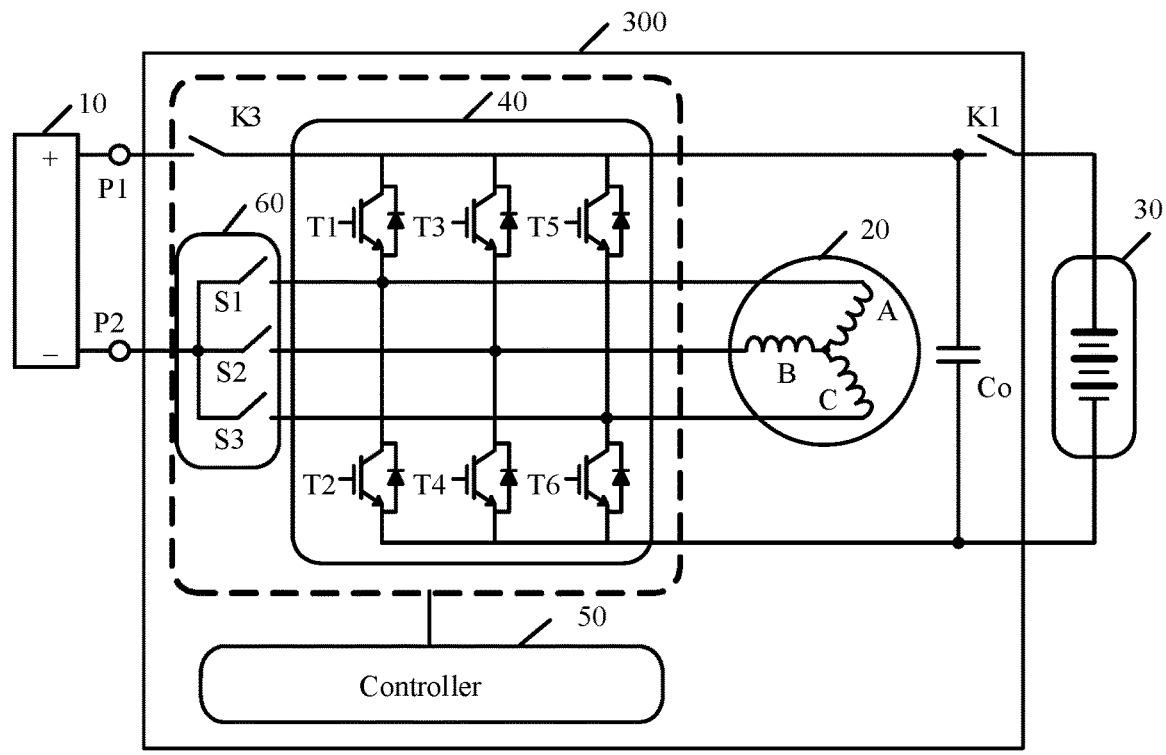
FIG. 30 is a schematic diagram of a powertrain according to an embodiment of this application.

FIG. 30 is a schematic diagram of a powertrain according to an embodiment of this application.

A powertrain 300 includes the motor control unit provided in the foregoing embodiments, and further includes a three-phase motor 20.

The output of the motor control unit is connected to the three-phase motor 20.

The three-phase motor 20 is configured to convert electric energy into mechanical energy to drive an electric vehicle.

For a embodiment of the motor control unit, refer to the related description in the foregoing embodiments, and details are not described herein in this embodiment of this application.

In the powertrain provided in this embodiment of this application, the inverter circuit of the motor control unit and the winding of the three-phase motor are reused. The controller controls the first direct current switch, the second direct current switch, the controllable switch, and the controllable switching transistor in the inverter circuit, thereby implementing functions of the boost circuit and the buck circuit without requiring an inductor, and reducing a volume and hardware costs that are required by the motor control unit. In addition, the powertrain is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended and applicability is improved.

In some other embodiments, the powertrain may alternatively include the motor control unit shown in FIG. 25a to FIG. 25e. Details are not described herein in this embodiment of this application.

Based on the powertrain provided in the foregoing embodiment, an embodiment of this application further provides an electric vehicle. The following provides a description with reference to the accompanying drawings.

Figure 31:
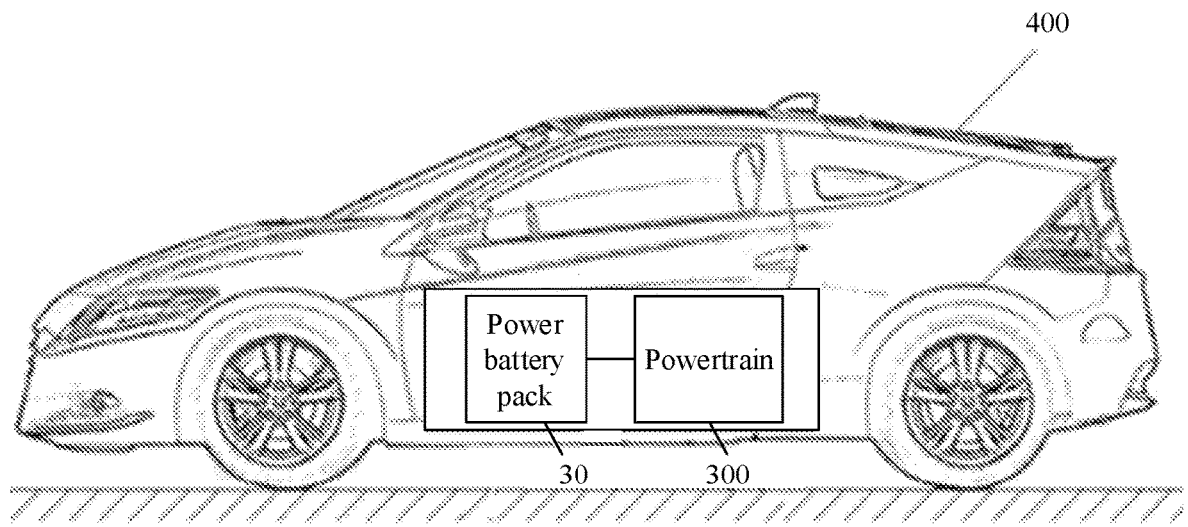
FIG. 31 is a schematic diagram of an electric vehicle according to an embodiment of this application.

FIG. 31 is a schematic diagram of an electric vehicle according to an embodiment of this application.

An illustrated electric vehicle 400 includes a power battery pack 30 and a powertrain 300.

The powertrain 300 includes the motor control unit provided in the foregoing embodiments, and further includes a three-phase motor 20.

The output of the motor control unit is connected to the three-phase motor 20.

The three-phase motor 20 is configured to convert electric energy into mechanical energy to drive the electric vehicle.

For a embodiment of the motor control unit, refer to the related description in the foregoing embodiments, and details are not described herein in this embodiment of this application.

A first output terminal of the power battery pack 30 is connected to the first input terminal of the inverter circuit, and a second output terminal of the power battery pack is connected to the second input terminal of the inverter circuit.

In the electric vehicle provided in this embodiment of this application, the inverter circuit of the motor control unit and the winding of the three-phase motor are reused. The controller controls the first direct current switch, the second direct current switch, the controllable switch, and the controllable switching transistor in the inverter circuit, to implement functions of the boost circuit and the buck circuit without requiring an inductor. This reduces a volume and hardware costs that are required by the motor control unit.

In addition, the electric vehicle is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended, and applicability is improved.

In some other embodiments, the electric vehicle may alternatively include the motor control unit shown in FIG. 25a to FIG. 25e. Details are not described herein in this embodiment of this application.

Based on the motor control unit provided in the foregoing embodiments, an embodiment of this application further provides a control method for a motor control unit. The following provides a description.

Using the motor control unit shown in FIG. 2 as an example, the method includes the following operations:

A: Obtain voltage information sent by a vehicle control unit of an electric vehicle.

B: Control the first direct current switch, the second direct current switch, the controllable switch, and the inverter circuit based on the voltage information, so that a power supply charges a power battery pack when the power transmission interface is connected to the power supply, and the power battery pack discharges electricity into a load when the power transmission interface is connected to the load.

The voltage information represents a value relationship between a voltage provided by a direct current charging pile and a voltage of the power battery pack, or represents a value relationship between a voltage provided by the power battery pack and a voltage required by the load.

The following provides a description with reference to the embodiment shown in FIG. 2. Operation B includes:

B1: When determining, based on the voltage information, that the power transmission interface is connected to the power supply and that a voltage provided by the power supply is less than the voltage of the power battery pack, control the first direct current switch and the second direct current switch to be closed, and control the controllable switch and the inverter circuit so that the power supply charges two-phase motor windings of the three-phase motor.

Then, the controllable switch and the inverter circuit are controlled so that the two-phase motor windings and the power supply are connected in series to charge the power battery pack.

B2: When determining, based on the voltage information, that the power transmission interface is connected to the power supply and that a voltage provided by the power supply is greater than the voltage of the power battery pack, first control the first direct current switch to be closed and the second direct current switch to be open, and control the controllable switch and the inverter circuit so that the power supply charges two-phase motor windings of the three-phase motor.

Then, the first direct current switch is controlled to be open, the second direct current switch is controlled to be closed, and the controllable switch and the inverter circuit are controlled so that the two-phase motor charges the power battery pack.

B3: When determining, based on the voltage information, that the power transmission interface is connected to the load and that a voltage required by the load is less than the voltage of the power battery pack, first control the first direct current switch and the second direct current switch to be closed, and control the controllable switch and the inverter circuit so that the power battery pack supplies power to the load and charges two-phase motor windings of the three-phase motor.

Then, the controllable switch and the inverter circuit are controlled so that the two-phase motor windings supply power to the load.

B4: When determining, based on the voltage information, that the power transmission interface is connected to the load and that a voltage required by the load is greater than the voltage of the power battery pack, first control the first direct current switch to be open and the second direct current switch to be closed, and control the controllable switch and the inverter circuit so that the power battery pack charges two-phase motor windings of the three-phase motor.

Then, the first direct current switch is controlled to be closed, the second direct current switch is controlled to be open, and the controllable switch and the inverter circuit are controlled so that the two-phase motor windings supply power to the load.

The foregoing division of operations is merely for ease of explanation and description, and does not constitute a limitation on an execution sequence of the solution in this application.

In one embodiment, the method further includes the following operation:

controlling the controllable switch and the inverter circuit based on a preset time to switch a motor winding that accesses a loop.

In one embodiment, the method further includes the following operation:

controlling the controllable switch and the inverter circuit based on obtained temperature information of motor windings to switch a motor winding that accesses a loop.

For embodiments shown in other accompanying drawings, corresponding control methods for a motor control unit are similar. Details are not described herein in this embodiment of this application.

In the control method provided in this embodiment of this application, the inverter circuit of the motor control unit and the winding of the three-phase motor are reused. The first direct current switch, the second direct current switch, the controllable switch, and the controllable switching transistor in the inverter circuit are controlled, thereby implementing functions of the boost circuit and the buck circuit without requiring an inductor, and reducing a volume and hardware costs that are required by the motor control unit.

In addition, the control method is applicable to a plurality of scenarios such as charging a low-voltage power battery pack by a high-voltage direct current power supply, charging a high-voltage power battery pack by a low-voltage direct current power supply, discharging electricity into a low-voltage load (a low-voltage direct current power grid, or a low-voltage power battery pack of another electric vehicle) by a high-voltage power battery pack, and discharging electricity into a high-voltage load (a high-voltage direct current power grid, or a high-voltage power battery pack of another electric vehicle) by a low-voltage power battery pack. Therefore, application scenarios are extended, and applicability is improved.

It may be understood that the motor control unit provided in the foregoing description of the embodiments of this application can be used in a plurality of application scenarios. In actual application, one or more application scenarios may be flexibly selected as required. For example, only buck charging of a power battery pack by a direct current charging pile is implemented. Therefore, in some embodiments, the first direct current switch may be directly reused as a fast charge contactor of a current electric vehicle, and the second direct current switch may be directly reused as a direct current switch included in a current power battery pack.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

The embodiments in this specification are all described in a progressive manner, for same or similar parts in the embodiments, refer to these embodiments, and each embodiment focuses on a difference from other embodiments. In addition, some or all of the units and modules may be selected based on actual requirements to achieve the objectives of the solutions in the embodiments. A person of ordinary skill in the art may understand and implement the embodiments without creative efforts.

The foregoing is merely an embodiment of this application. It should be noted that a person of ordinary skill in the art may further make improvements and refinements without departing from the principles of this application. These improvements and refinements shall also fall within the protection scope of this application.

What is claimed is:

1. A motor control unit, wherein an input of the motor control unit is connected to a power battery pack of an electric vehicle, an output of the motor control unit is connected to a three-phase motor, the motor control unit comprising:

a power transmission interface, an inverter circuit, a switch circuit, a first direct current switch, a second direct current switch, and a controller, wherein, a first terminal of the power transmission interface is connected to a first input terminal of the inverter circuit by using the first direct current switch, and a second terminal of the power transmission interface is connected to a first terminal of the switch circuit;

wherein, the switch circuit comprises three switch branches, wherein first terminals of the three switch branches are connected to the first terminal of the switch circuit, second terminals of the three switch branches are respectively connected to one-phase output terminals of the inverter circuit, and each switch branch comprises a separately controlled controllable switch;

the first input terminal of the inverter circuit is connected to the power battery pack using the second direct current switch; and the controller is configured to control the first direct current switch, the second direct current switch, the controllable switch, and the inverter circuit, such that a power supply charges the power battery pack, when the power transmission interface is connected to the power supply, and the power battery pack discharges electricity into a load when the power transmission interface is connected to the load.

2. The motor control unit according to claim 1, wherein the controller is configured to obtain voltage information sent by a vehicle control unit of the electric vehicle, and control the first direct current switch, the second direct current switch, the controllable switch, and the inverter circuit based on the voltage information.

3. The motor control unit according to claim 2, wherein, when the controller determines, based on the voltage information, that the power transmission interface is connected to the power supply and that a voltage provided by the power supply is less than a voltage of the power battery pack, the controller controls the first direct current switch and the second direct current switch to be closed, and controls the controllable switch and the inverter circuit such that the power supply charges two-phase motor windings of the three-phase motor; and the controller then controls the controllable switch and the inverter circuit such that the two-phase motor windings and the power supply are connected in series to charge the power battery pack.

4. The motor control unit according to claim 2, wherein, when the controller determines, based on the voltage information, that the power transmission interface is connected to the power supply and that a voltage provided by the power supply is greater than a voltage of the power battery pack, the controller first controls the first direct current switch to be closed and the second direct current switch to be open, and controls the controllable switch and the inverter circuit such that the power supply charges two-phase motor windings of the three-phase motor; and the controller then controls the first direct current switch to be open and the second direct current switch to be closed, and controls the controllable switch and the inverter circuit such that the two-phase motor windings charge the power battery pack.

5. The motor control unit according to claim 2, wherein, when the controller determines, based on the voltage information, that the power transmission interface is connected to the load and that a voltage required by the load is less than a voltage of the power battery pack, the controller first controls the first direct current switch and the second direct current switch to be closed, and controls the controllable switch and the inverter circuit such that the power battery pack supplies power to the load and charges two-phase motor windings of the three-phase motor; and the controller then controls the controllable switch and the inverter circuit such that the two-phase motor windings supply power to the load.

6. The motor control unit according to claim 2, wherein, when the controller determines, based on the voltage information, that the power transmission interface is connected to the load and that a voltage required by the load is greater than a voltage of the power battery pack, the controller first controls the first direct current switch to be open and the second direct current switch to be closed, and controls the controllable switch and the inverter circuit such that the power battery pack charges two-phase motor windings of the three-phase motor; and the controller then controls the first direct current switch to be closed and the second direct current switch to be open, and controls the controllable switch and the inverter circuit such that the two-phase motor windings supply power to the load.

7. The motor control unit according to claim 2, wherein, the motor control unit further comprises a third direct current switch, a first terminal of the third direct current switch connected to the first terminal of the switch circuit, and a second terminal of the third direct current switch connected to a second input terminal of the inverter circuit; and the controller is further configured to: when determining, based on the voltage information, that a voltage provided by the power supply matches a voltage of the power battery pack, or when determining, based on the voltage information, that a voltage required by the load matches a voltage of the power battery pack, control the first direct current switch, the second direct current switch, and the third direct current switch to be closed.

8. The motor control unit according to claim 7, wherein the motor control unit further comprises a first capacitor, and, the first capacitor is connected in parallel between the first terminal and the second terminal of the power transmission interface.

9. The motor control unit according to claim 2, wherein, the motor control unit further comprises a third direct current switch and a fourth direct current switch, a first terminal of the third direct current switch is connected to the first terminal of the switch circuit, and a second terminal of the third direct current switch is connected to a second input terminal of the inverter circuit;

the fourth direct current switch is a single-pole double-throw switch, a first non-movable terminal of the fourth direct current switch is connected to the first terminal of the switch circuit, a second non-movable terminal of the fourth direct current switch is connected to the first input terminal of the inverter circuit, and a movable terminal of the fourth direct current switch is connected to a first terminal of the power battery pack; and the controller is further configured to control working statuses of the third direct current switch and the fourth direct current switch based on the voltage information.

10. The motor control unit according to claim 9, wherein the controller is configured to: when determining, based on the voltage information, that a voltage provided by the power supply matches a voltage of the power battery pack, or when determining, based on the voltage information, that a voltage required by the load matches a voltage of the power battery pack, control the first direct current switch, the second direct current switch, and the third direct current switch to be closed, and control the movable terminal of the fourth direct current switch to be connected to the second non-movable terminal.

11. The motor control unit according to claim 9, wherein, when the controller determines, based on the voltage information, that the power transmission interface is connected to the power supply and that a voltage provided by the power supply is less than a voltage of the power battery pack, the controller controls the movable terminal of the fourth direct current switch to be connected to the second non-movable terminal, controls the first direct current switch and the second direct current switch to be closed, controls the third direct current switch to be open, and controls the controllable switch and the inverter circuit such that the power supply charges two-phase motor windings of the three-phase motor; and the controller then controls the controllable switch and the inverter circuit such that the two-phase motor windings and the power supply are connected in series to charge the power battery pack.

12. The motor control unit according to claim 9, wherein, when the controller determines, based on the voltage information, that the power transmission interface is connected to the power supply and that a voltage provided by the power supply is greater than a voltage of the power battery pack, the controller first controls the movable terminal of the fourth direct current switch to be connected to the second non-movable terminal, controls the first direct current switch to be closed, controls the second direct current switch to be open, controls the third direct current switch to be open, and controls the controllable switch and the inverter circuit such that the power supply charges two-phase motor windings of the three-phase motor; and the controller then controls the first direct current switch to be open and the second direct current switch to be closed, and controls the controllable switch and the inverter circuit such that the two-phase motor windings charge the power battery pack.

13. The motor control unit according to claim 9, wherein, when the controller determines, based on the voltage information, that the power transmission interface is connected to the load and that a voltage required by the load is less than a voltage of the power battery pack, the controller first controls the movable terminal of the fourth direct current switch to be connected to the second non-movable terminal, controls the first direct current switch and the second direct current switch to be closed, controls the third direct current switch to be open, and controls the controllable switch and the inverter circuit such that the power battery pack supplies power to the load and charges two-phase motor windings of the three-phase motor; and the controller then controls the controllable switch and the inverter circuit such that the two-phase motor windings supply power to the load.

14. The motor control unit according to claim 9, wherein, when the controller determines, based on the voltage information, that the power transmission interface is connected to the load and that a voltage required by the load is greater than a voltage of the power battery pack, the controller first controls the movable terminal of the fourth direct current switch to be connected to the second non-movable terminal, controls the first direct current switch to be open, controls the second direct current switch to be closed, controls the third direct current switch to be open, and controls the controllable switch and the inverter circuit such that the power battery pack charges two-phase motor windings of the three-phase motor; and the controller then controls the first direct current switch to be closed and the second direct current switch to be open, and controls the controllable switch and the inverter circuit such that the two-phase motor windings and the power battery pack are connected in series to supply power to the load.

15. The motor control unit according to claim 9, wherein the motor control unit further comprises a sixth direct current switch, a first terminal of the sixth direct current switch is connected to the first terminal of the third direct current switch, and a second terminal of the sixth direct current switch is connected to the first terminal of the switch circuit;

when the controller determines, based on the voltage information, that the power transmission interface is connected to the power supply and that a voltage provided by the power supply is greater than a voltage of the power battery pack, the controller controls the movable terminal of the fourth direct current switch to be connected to the first non-movable terminal, controls the first direct current switch, the second direct current switch, and the third direct current switch to be closed, controls the sixth direct current switch to be open, and controls the controllable switch and the inverter circuit such that the power supply charges two-phase motor windings of the three-phase motor and the power battery pack; and the controller then controls the controllable switch and the inverter circuit such that the two-phase motor windings charge the power battery pack.

16. The motor control unit according to claim 15, wherein, when the controller determines, based on the voltage information, that the power transmission interface is connected to the load and that a voltage required by the load is greater than a voltage of the power battery pack, the controller first controls the movable terminal of the fourth direct current switch to be connected to the first non-movable terminal, controls the first direct current switch, the second direct current switch, and the third direct current switch to be closed, controls the sixth direct current switch to be open, and controls the controllable switch and the inverter circuit so that the power battery pack charges two-phase motor windings of the three-phase motor; and the controller then controls the controllable switch and the inverter circuit such that the two-phase motor windings and the power battery pack are connected in series to supply power to the load.

17. The motor control unit according to claim 2, wherein, the motor control unit further comprises a fourth direct current switch and a sixth direct current switch;

a first terminal of the sixth direct current switch is connected to the second terminal of the power transmission interface, and a second terminal of the sixth direct current switch is connected to the first terminal of the switch circuit;

the fourth direct current switch is a single-pole double-throw switch, a first non-movable terminal of the fourth direct current switch is connected to the first terminal of the switch circuit, a second non-movable terminal of the fourth direct current switch is connected to the first input terminal of the inverter circuit, and a movable terminal of the fourth direct current switch is connected to a first terminal of the power battery pack; and the controller is further configured to control working statuses of the fourth direct current switch and the sixth direct current switch based on the voltage information.

18. The motor control unit according to claim 17, wherein, when the controller determines, based on the voltage information, that the power transmission interface is connected to the power supply and that a voltage provided by the power supply is less than a voltage of the power battery pack, the controller controls the first direct current switch and the second direct current switch to be closed, controls the movable terminal of the fourth direct current switch to be connected to the second non-movable terminal, and controls the controllable switch and the inverter circuit such that the power supply charges two-phase motor windings of the three-phase motor; and the controller then controls the second direct current switch to be open, and controls the controllable switch and the inverter circuit such that the two-phase motor windings and the power supply are connected in series to charge the power battery pack.

19. The motor control unit according to claim 17, wherein, when the controller determines, based on the voltage information, that the power transmission interface is connected to the load and that a voltage required by the load is less than a voltage of the power battery pack, the controller first controls the first direct current switch and the second direct current switch to be closed, controls the movable terminal of the fourth direct current switch to be connected to the second non-movable terminal, and controls the controllable switch and the inverter circuit such that the power battery pack supplies power to the load and charges two-phase motor windings of the three-phase motor; and the controller then controls the controllable switch and the inverter circuit such that the two-phase motor windings supply power to the load.

20. The motor control unit according to claim 17, wherein, when the controller determines, based on the voltage information, that the power transmission interface is connected to the power supply, the controller first controls the first direct current switch and the sixth direct current switch to be closed, controls the movable terminal of the fourth direct current switch to be connected to the first non-movable terminal, and controls the controllable switch and the inverter circuit such that the power supply charges two-phase motor windings of the three-phase motor; and the controller then controls the first direct current switch to be open, and controls the controllable switch and the inverter circuit such that the two-phase motor windings charge the power battery pack.

* * * * *